US011229021B2

(12) United States Patent
Park et al.

(10) Patent No.: US 11,229,021 B2
(45) Date of Patent: Jan. 18, 2022

(54) TECHNIQUES FOR SWITCHING CONTROL CHANNEL MONITORING FOR MULTI-TRANSMISSION/RECEPTION POINT

(71) Applicant: QUALCOMM Incorporated, San Diego, CA (US)

(72) Inventors: Sungwoo Park, San Diego, CA (US); Xiaoxia Zhang, San Diego, CA (US); Tao Luo, San Diego, CA (US); Mostafa Khoshnevisan, San Diego, CA (US); Jing Sun, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 16/802,332

(22) Filed: Feb. 26, 2020

(65) Prior Publication Data

US 2020/0296700 A1 Sep. 17, 2020

Related U.S. Application Data

(60) Provisional application No. 62/819,657, filed on Mar. 17, 2019.

(51) Int. Cl.
*H04W 72/04* (2009.01)
*H04W 24/10* (2009.01)
*H04L 1/18* (2006.01)

(52) U.S. Cl.
CPC ......... *H04W 72/042* (2013.01); *H04L 1/1812* (2013.01); *H04W 24/10* (2013.01)

(58) Field of Classification Search
CPC ............ H04W 72/042; H04W 72/0446; H04L 1/0038
See application file for complete search history.

(56) References Cited

U.S. PATENT DOCUMENTS

2011/0013600 A1* 1/2011 Kim ..................... H04L 5/0096
2017/0302427 A1* 10/2017 Stattin .................. H04L 5/0087
2018/0270699 A1* 9/2018 Babaei ............. H04W 72/1284

FOREIGN PATENT DOCUMENTS

WO  WO-2016055834 A1  4/2016
WO  WO-2018140176 A1  8/2018

OTHER PUBLICATIONS

International Search Report and Written Opinion—PCT/US2020/020098—ISA/EPO—dated May 27, 2020.

(Continued)

*Primary Examiner* — Ronald B Abelson
(74) *Attorney, Agent, or Firm* — Dalei Dong; Holland & Hart LLP

(57) ABSTRACT

Methods, systems, and devices for wireless communications are described. A user equipment (UE) may operate in a multi-transmission/reception point (TRP) mode, where the multi-TRP mode includes monitoring a plurality of control channels and where each of the plurality of control channels may be associated with a TRP. The UE may operate in a first control channel monitoring state of the multi-TRP mode, where the UE may be configured to monitor a first control channel of a first TRP. The UE may identify an indication to switch from the first control channel monitoring state to a second control channel monitoring state of the multi-TRP mode. The UE may switch, based on the indication, to the second control channel monitoring state, where the UE may be configured to monitor the first control channel of the first TRP and monitor a second control channel of the second TRP.

22 Claims, 18 Drawing Sheets

(56) References Cited

OTHER PUBLICATIONS

Qualcomm Incorporated: "Open Issues on CA," 3GPP Draft, 3GPP TSG RAN WG1 Meeting #91, R1-1720694, Open Issues on CA, 3rd Generation Partnership Project (3GPP), Mobile Competence Centre, 650, Route Des Lucioles, F-06921, Sophia-Antipolis Cedex, France, vol. RAN WG1, No. Reno, NV, USA; Nov. 27, 2017-Dec. 1, 2017, Nov. 18, 2017 (Nov. 18, 2017), XP051370155, 14 pages, Retrieved from the Internet: URL: http://www.3gpp.org/ftp/tsg%5Fran/WG1%5FRL1/TSGR1%5F91/Docs/ [retrieved on Nov. 18, 2017], paragraph [02.2], paragraph [02.3], figure 1.

* cited by examiner

TECHNIQUES FOR SWITCHING CONTROL CHANNEL MONITORING FOR MULTI-TRANSMISSION/RECEPTION POINT

CROSS REFERENCE

The present Application for Patent claims the benefit of U.S. Provisional Patent Application No. 62/819,657 by PARK et al., entitled "TECHNIQUES FOR SWITCHING CONTROL CHANNEL MONITORING FOR MULTI-TRANSMISSION/RECEPTION POINT," filed Mar. 17, 2019, assigned to the assignee hereof, and which is hereby incorporated by reference in its entirety.

FIELD OF DISCLOSURE

The present disclosure, for example, relates to wireless communication systems, more particularly to techniques for switching control channel monitoring for multi-transmission/reception point (TRP).

BACKGROUND

The following relates to wireless communications, and more specifically to techniques for switching control channel monitoring for multi-transmission/reception point (TRP).

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communication systems, base stations may communicate with UEs using TRPs. For example, the network may communicate with a UE using a single TRP at a base station, using multiple TRPs corresponding to a same base station, or using multiple TRPs corresponding to multiple base stations. In cases where the network uses multiple TRPs to communicate with the UE, whether at the same base station or different base stations, the network may use a number of different multi-TRP configurations for the communications with the UE. Some multi-TRP configurations may include configuring the UE to operate in a single TRP mode, where the UE maintains a radio resource control (RRC) connected state with a first TRP (or a master TRP), or operates in a multi-TRP mode, where the UE maintains an RRC connected state with the first TRP and a second TRP (and additional TRPs in some examples). Some operations in the multi-TRP mode, however, may result in increased overhead, power consumption, and/or latency due to control channel monitoring configurations.

SUMMARY

The described techniques relate to improved techniques, devices, and apparatuses that support techniques for switching control channel monitoring for multi-transmission/reception point (TRP). For example, the present disclosure provides for a user equipment (UE) to operate in different control channel monitoring states while configured to operate in a multi-TRP mode. The UE may be semi-statically configured to operate in the multi-TRP mode, e.g., using radio resource control (RRC) signaling, a medium access control (MAC) control element (CE), or the like. The UE may be dynamically configured to operate in a first control channel monitoring state of the multi-TRP mode, where the UE may monitor a control channel of a first TRP (e.g., a master TRP of the multi-TRPs). The UE, however, may not monitor a control channel transmitted from a second TRP. The UE may receive or identify an indication to switch from the first control channel monitoring state to a second control channel monitoring state of the multi-TRP mode. The indication may be identified dynamically, e.g., based on signaling and/or based on a timer associated with the first control channel monitoring state. The UE may switch to the second control channel monitoring state, where the UE may monitor the control channel of both the first TRP and the second TRP.

A method of wireless communication at a UE is described. The method may include operating, by the UE, in a multi-TRP mode, where the multi-TRP mode includes monitoring a set of control channels and each of the set of control channels is associated with a TRP. The method may further include operating in a first control channel monitoring state of the multi-TRP mode where the UE is configured to monitor a first control channel of a first TRP, identifying an indication to switch from the first control channel monitoring state to a second control channel monitoring state of the multi-TRP mode, and switching, based on the indication, to the second control channel monitoring state where the UE is configured to monitor the first control channel of the first TRP and monitor a second control channel of a second TRP.

An apparatus for wireless communication at a UE is described. The apparatus may include a processor, memory coupled with the processor, and instructions stored in the memory. The instructions may be executable by the processor to cause the apparatus to operate, by the UE, in a multi-TRP mode, where the multi-TRP mode includes monitoring a set of control channels and each of the set of control channels is associated with a TRP. The instructions may be further executable by the processor to cause the apparatus to operate in a first control channel monitoring state of the multi-TRP mode where the UE is configured to monitor a first control channel of a first TRP, identify an indication to switch from the first control channel monitoring state to a second control channel monitoring state of the multi-TRP mode, and switch, based on the indication, to the second control channel monitoring state where the UE is configured to monitor the first control channel of the first TRP and monitor a second control channel of a second TRP.

Another apparatus for wireless communication at a UE is described. The apparatus may include means for operating, by the UE, in a multi-TRP mode, where the multi-TRP mode includes monitoring a set of control channels and each of the set of control channels is associated with a TRP. The apparatus may further include means for operating in a first control channel monitoring state of the multi-TRP mode where the UE is configured to monitor a first control channel of a first TRP, identifying an indication to switch from the first control channel monitoring state to a second control channel monitoring state of the multi-TRP mode, and switching, based on the indication, to the second control channel monitoring state where the UE is configured to monitor the first control channel of the first TRP and monitor a second control channel of a second TRP.

A non-transitory computer-readable medium storing code for wireless communication at a UE is described. The code may include instructions executable by a processor to operate, by the UE, in a multi-TRP mode, where the multi-TRP mode includes monitoring a set of control channels and each of the set of control channels is associated with a TRP. The code may further include instructions executable by the processor to operate in a first control channel monitoring state of the multi-TRP mode where the UE is configured to monitor a first control channel of a first TRP, identify an indication to switch from the first control channel monitoring state to a second control channel monitoring state of the multi-TRP mode, and switch, based on the indication, to the second control channel monitoring state where the UE is configured to monitor the first control channel of the first TRP and monitor a second control channel of a second TRP.

In some examples of the method, apparatuses, and non-transitory computer-readable medium described herein, identifying the indication may include operations, features, means, or instructions for receiving, from the first TRP, at least one of a downlink control information (DCI) signal, a MAC CE signal, or a combination thereof, indicating for the UE to switch to the second control channel monitoring state.

Some examples of the method, apparatuses, and non-transitory computer-readable medium described herein may further include operations, features, means, or instructions for initiating, based on identifying the indication, a timer associated with the first control channel monitoring state, and switching, upon expiry of a timer duration associated with the timer, from the first control channel monitoring state to the second control channel monitoring state.

Some examples of the method, apparatuses, and non-transitory computer-readable medium described herein may further include operations, features, means, or instructions for receiving, from the first TRP, the second TRP, or a combination thereof, at least one of a DCI, a MAC CE, an RRC signal, or a combination thereof, indicating the timer duration.

In some examples of the method, apparatuses, and non-transitory computer-readable medium described herein, identifying the indication may include operations, features, means, or instructions for receiving, from the first TRP, a bandwidth part (BWP) switching DCI indicating a change in the BWP associated with the first TRP, where receiving the BWP switching DCI includes the indication.

Some examples of the method, apparatuses, and non-transitory computer-readable medium described herein may further include operations, features, means, or instructions for transmitting, based on the switching to the second control channel monitoring state, an acknowledgement/negative-acknowledgement (ACK/NACK) signal to the first TRP and the second TRP indicating that the UE may have switched to the second control channel monitoring state.

Some examples of the method, apparatuses, and non-transitory computer-readable medium described herein may further include operations, features, means, or instructions for identifying a subsequent indication to switch from the second control channel monitoring state to the first control channel monitoring state, and switching, based on the subsequent indication, from the second control channel monitoring state to the first control channel monitoring state.

In some examples of the method, apparatuses, and non-transitory computer-readable medium described herein, identifying the subsequent indication may include operations, features, means, or instructions for receiving, from the first TRP or the second TRP, at least one of a DCI signal, a MAC CE signal, or a combination thereof, indicating for the UE to switch to the first control channel monitoring state.

In some examples of the method, apparatuses, and non-transitory computer-readable medium described herein, identifying the subsequent indication may include operations, features, means, or instructions for initiating, upon switching to the second control channel monitoring state, a timer associated with the second control channel monitoring state, and switching, upon expiry of the timer, to the first control channel monitoring state.

A method of wireless communication at a first TRP is described. The method may include operating, with a UE, in a multi-TRP mode, the multi-TRP mode including the UE configured to monitor a set of control channels and each of the set of control channels is associated with a TRP. The method may further include operating, with the UE, in a first control channel monitoring state of the multi-TRP mode where the UE is configured to monitor a first control channel of the first TRP, transmitting a signal to the UE indicating that the UE is to switch from the first control channel monitoring state to a second control channel monitoring state of the multi-TRP mode, and operating, with the UE and based on the signal, in the second control channel monitoring state where the UE is configured to monitor the first control channel of the first TRP and monitor a second control channel of a second TRP.

An apparatus for wireless communication at a first TRP is described. The apparatus may include a processor, memory coupled with the processor, and instructions stored in the memory. The instructions may be executable by the processor to cause the apparatus to operate, with a UE, in a multi-TRP mode, the multi-TRP mode including the UE configured to monitor a set of control channels and each of the set of control channels is associated with a TRP. The instructions may be further executable by the processor to cause the apparatus to operate, with the UE, in a first control channel monitoring state of the multi-TRP mode where the UE is configured to monitor a first control channel of the first TRP, transmit a signal to the UE indicating that the UE is to switch from the first control channel monitoring state to a second control channel monitoring state of the multi TRP mode, and operate, with the UE and based on the signal, in the second control channel monitoring state where the UE is configured to monitor the first control channel of the first TRP and monitor a second control channel of a second TRP.

Another apparatus for wireless communication at a first TRP is described. The apparatus may include means for operating, with a UE, in a multi-TRP mode, the multi-TRP mode including the UE configured to monitor a set of control channels and each of the set of control channels is associated with a TRP. The apparatus may further include means for operating, with the UE, in a first control channel monitoring state of the multi-TRP mode where the UE is configured to monitor a first control channel of the first TRP, transmitting a signal to the UE indicating that the UE is to switch from the first control channel monitoring state to a second control channel monitoring state of the multi TRP mode, and operating, with the UE and based on the signal, in the second control channel monitoring state where the UE is configured to monitor the first control channel of the first TRP and monitor a second control channel of a second TRP.

A non-transitory computer-readable medium storing code for wireless communication at a first TRP is described. The code may include instructions executable by a processor to operate, with a UE, in a multi-TRP mode, the multi-TRP mode including the UE configured to monitor a set of control channels and each of the set of control channels is associated with a TRP. The code may further include instructions executable by a processor to operate, with the UE, in a first control channel monitoring state of the multi-TRP mode where the UE is configured to monitor a first control channel of the first TRP, transmit a signal to the UE indicating that the UE is to switch from the first control channel monitoring state to a second control channel monitoring state of the multi TRP mode, and operate, with the UE and based on the signal, in the second control channel monitoring state where the UE is configured to monitor the first control channel of the first TRP and monitor a second control channel of a second TRP.

Some examples of the method, apparatuses, and non-transitory computer-readable medium described herein may further include operations, features, means, or instructions for receiving, from the UE and while operating in the first control channel monitoring state, a channel performance measurement report indicating a result of a channel performance measurement using one or more signals from the first TRP.

Some examples of the method, apparatuses, and non-transitory computer-readable medium described herein may further include operations, features, means, or instructions for transmitting, in the signal, an indication of a timer duration for a timer associated with the first control channel monitoring state, the second control channel monitoring state, or a combination thereof.

Some examples of the method, apparatuses, and non-transitory computer-readable medium described herein may further include operations, features, means, or instructions for receiving an ACK/NACK signal from the UE indicating that the UE may have switched to the second control channel monitoring state.

Some examples of the method, apparatuses, and non-transitory computer-readable medium described herein may further include operations, features, means, or instructions for transmitting, to the UE, at least one of a DCI signal, a MAC CE signal, or a combination thereof, indicating for the UE to switch from the second control channel monitoring state to the first control channel monitoring state.

In some examples of the method, apparatuses, and non-transitory computer-readable medium described herein, the signal includes at least one of a DCI, a MAC CE, a BWP switching DCI, or a combination thereof.

DETAILED DESCRIPTION

In some wireless communication systems, base stations may communicate with user equipments (UEs) using one or more transmission/reception points (TRPs). For example, a wireless communications network may communicate with a UE using a single TRP at a base station, using multiple TRPs corresponding to a same base station, or using multiple TRPs corresponding to multiple base stations. In cases where the network uses multiple TRPs to communicate with the UE, whether at a same base station or at different base stations, the network may use a number of different multi-TRP configurations for the communications with the UE. Some multi-TRP configurations may include configuring the UE to operate in a single TRP mode, where the UE maintains a radio resource control (RRC) connected state with a first TRP (e.g., with a master TRP). Some multi-TRP configurations may include configuring the UE to operate in a multi-TRP mode, where the UE maintains an RRC connected state with the first TRP and a second TRP (and additional TRPs in some examples). Some UE operations in the multi-TRP mode, however, may include monitoring a control channel for each respective TRP, which may waste time and power if one or more of the TRPs has no information to communicate to the UE.

Aspects of the disclosure are initially described in the context of a wireless communication system. The described techniques relate to improved techniques, devices, and apparatuses that support techniques for switching control channel monitoring for multi-TRP modes. For example, the present disclosure provides for a UE to operate in different control channel monitoring states while configured for a multi-TRP mode of communication. The UE may be configured to operate in the multi-TRP mode, for example, may be semi-statically configured using RRC signaling, a medium access control (MAC) control element (CE), and the like. The UE may be dynamically configured to operate in a first control channel monitoring state of the multi-TRP mode, where the UE monitors a control channel of a first TRP (e.g., a master TRP of a group of TRPs corresponding to the multi-TRP mode). The UE may identify an indication to switch from the first control channel monitoring state to a second control channel monitoring state of the multi-TRP mode. The indication may be identified dynamically, for example, based on signaling and/or based on a timer associated with the first control channel monitoring state. The UE may switch to the second control channel monitoring state of the multi-TRP mode. The second control channel monitoring state may include monitoring the control channels of the first and the second TRPs (and additional TRPs, when applicable).

Aspects of the disclosure are further illustrated by and described with reference to apparatus diagrams, system diagrams, and flowcharts that relate to techniques for switching control channel monitoring for multi-TRP.

Figure 1:
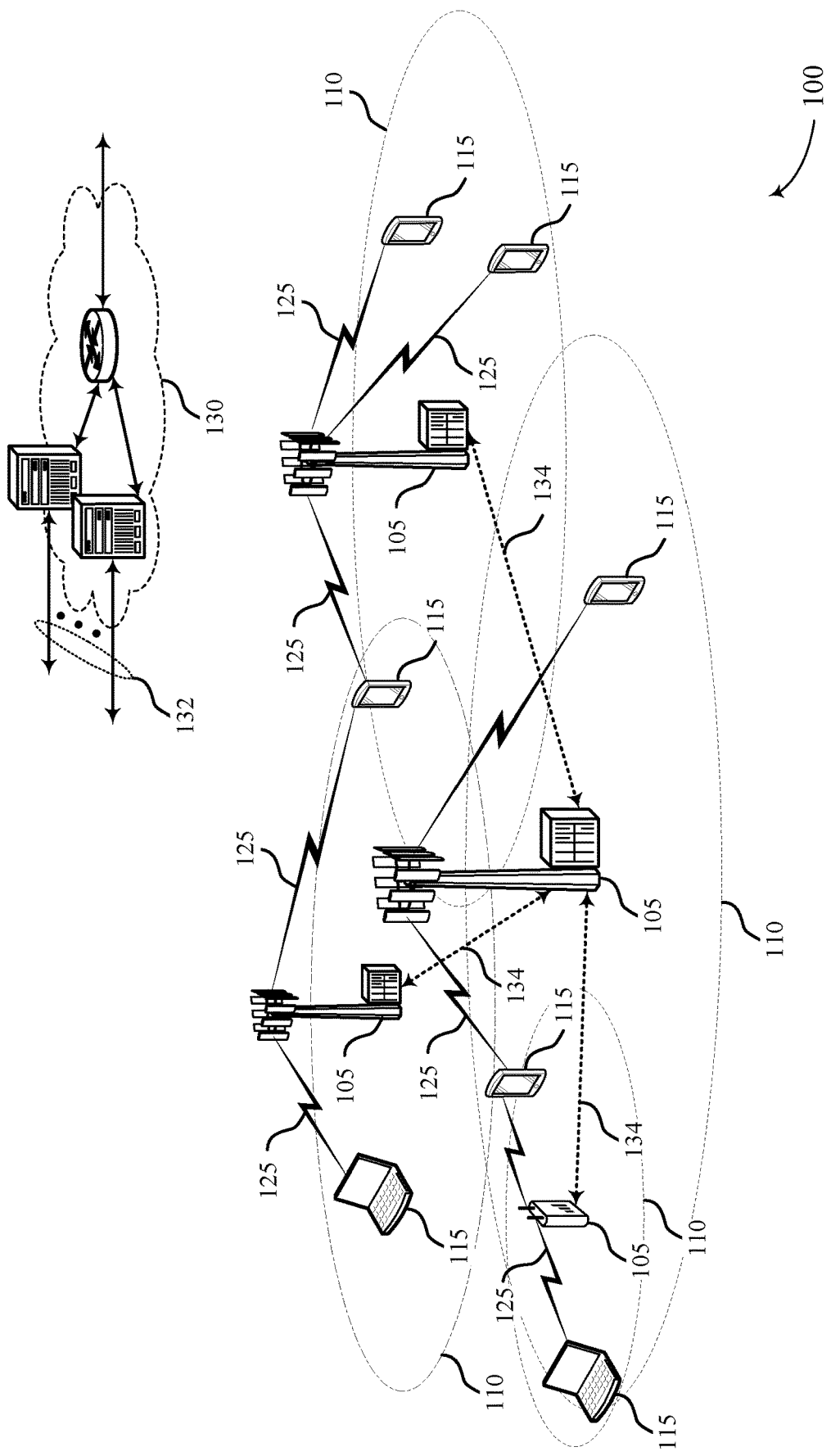
FIG. 1 illustrates an example of a wireless communications system that supports techniques for switching control channel monitoring for multi-transmission/reception point (TRP) in accordance with various aspects of the present disclosure.

FIG. 1 illustrates an example of a wireless communications system 100 that supports techniques for switching control channel monitoring for multi-TRP in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions.

The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some examples, various functions of each access network entity or base station 105 may be distributed across various network devices (e.g., radio heads and access network controllers) or consolidated into a single network device (e.g., a base station 105).

Wireless communications system 100 may operate using one or more frequency bands, for example, in the range of 300 megahertz (MHz) to 300 gigahertz (GHz). For example, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at orientations with respect to an antenna array experience constructive interference while others experience destructive interference. The adjustment of signals communicated via the antenna elements may include a transmitting device or a receiving device applying one or more amplitude and phase offsets to signals carried via each of the antenna elements associated with the device. The adjustments associated with each of the antenna elements may be defined by a beamforming weight set associated with an orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may operate in a multi-TRP mode, where the multi-TRP mode may include monitoring multiple control channels and where each of the multiple control channels may be associated with a TRP. The UE 115 may operate in a first control channel monitoring state of the multi-TRP mode, where the UE 115 may be configured to monitor a first control channel of a first TRP. The UE 115 may identify an indication to switch from the first control channel monitoring state to a second control channel monitoring state of the multi-TRP mode. The UE 115 may switch, based on the indication, to the second control channel monitoring state, where the UE 115 may be configured to monitor the first control channel of the first TRP and monitor a second control channel of a second TRP.

A base station 105, when configured as a first TRP, may operate, with a UE 115, in a multi-TRP mode, where the multi-TRP mode may include a configuration in which the UE 115 may monitor multiple control channels and where each of the multiple control channels may be associated with a TRP. The base station 105 may operate, with the UE 115, in a first control channel monitoring state of the multi-TRP mode, where the UE 115 may be configured to monitor a first control channel of the first TRP. The base station 105 may transmit a signal to the UE 115 indicating that the UE 115 is to switch from the first control channel monitoring state to a second control channel monitoring state of the multi-TRP mode. The base station 105 may operate, with the UE 115 and based on the signal, in the second control channel monitoring state, where the UE 115 may be configured to monitor the first control channel of the first TRP and monitor a second control channel of a second TRP.

Figure 2A:
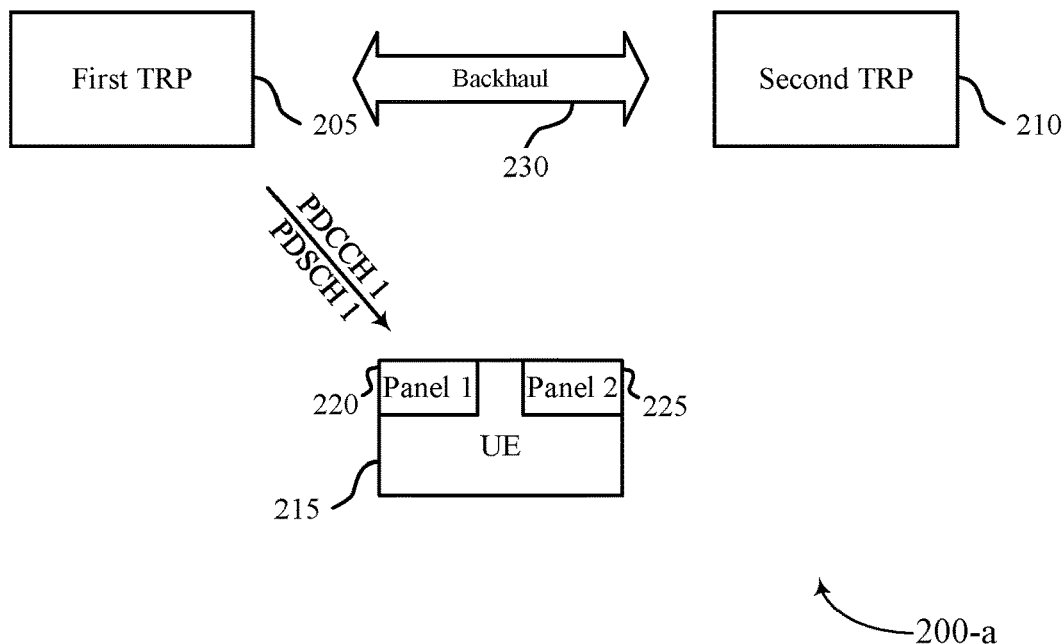
FIGS. 2A and 2B respectively illustrate examples of a wireless communication system that supports techniques for switching control channel monitoring for multi-TRP in accordance with various aspects of the present disclosure.
Figure 2B:
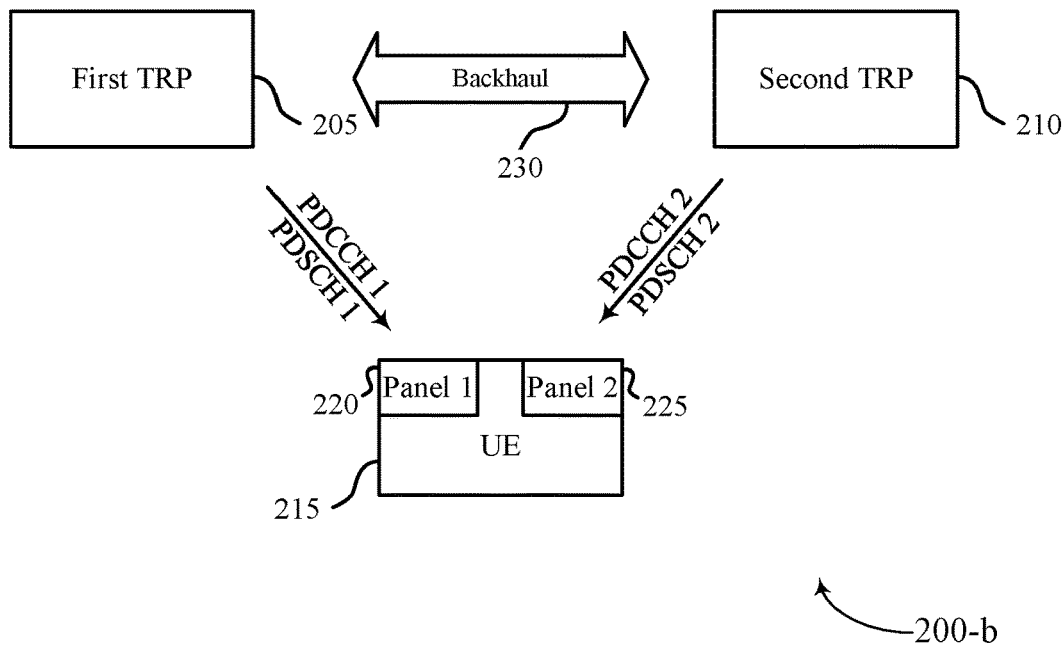

FIGS. 2A and 2B respectively illustrate examples of a wireless communications system 200-*a* and a wireless communications system 200-*b* that support techniques for switching control channel monitoring for multi-TRP in accordance with various aspects of the present disclosure. In some examples, a wireless communications system 200 may implement aspects of wireless communications system 100. Aspects of wireless communications system 200 may include a first TRP 205, a second TRP 210, and a UE 215, which may be examples of the corresponding devices described herein.

In some examples, the first TRP 205 and the second TRP 210 may be considered serving TRPs of UE 215, or may be otherwise associated with UE 215. In some cases, the first TRP 205 and the second TRP 210 may be connected or may otherwise communicate via a backhaul link 230. Although two TRPs are illustrated with respect to wireless communications system 200, it is to be understood that more than two TRPs may be configured as serving TRPs for UE 215. Accordingly, aspects of the present disclosure may be utilized in a situation where three or more TRPs are serving TRPs of UE 215.

Some multi-TRP transmissions may include two different modes for control channel operations. The first mode may include a multi-TRP mode operation (e.g., Mode 1) where a single control channel signal (e.g., a common physical downlink control channel (PDCCH)) may be transmitted to UE 215 by the first TRP 205 and may be associated with multiple downlink data transmissions (e.g., per-TRP physical downlink shared channel (PDSCH) transmissions). That is, the first TRP 205 may coordinate with the second TRP 210 over a backhaul link to schedule the downlink data transmissions to UE 215, and may transmit a downlink control channel signal to UE 215 configuring the downlink data transmissions for both the first TRP 205 and the second TRP 210. In some examples, the multi-TRP mode may be utilized or otherwise suitable for joint (or centralized) scheduling where the first TRP 205 and the second TRP 210 may communicate over an operational backhaul link.

The second mode may include a multi-TRP mode operation (e.g., Mode 2) where multiple control channel signals (e.g., per-TRP PDCCHs) may be transmitted to UE 215 with multiple downlink data transmissions (e.g., per-TRP PDSCHs). For example, the first TRP 205 and the second TRP 210 may coordinate downlink data transmissions to UE 215, and each of the first TRP 205 and the second TRP 210 may transmit a control signal to UE 215 configuring a downlink data transmission for UE 215. In some examples, the second multi-TRP mode may be utilized or otherwise suitable for distributed scheduling (e.g., or some other scheduling technique) where each TRP schedules its own transmissions to UE 215.

For example, UE 215 may be configured to operate in a single-TRP mode for communications between UE 215 and the first TRP 205, or in a multi-TRP mode for communications between UE 215 and the first TRP 205 and the second TRP 210. In some cases, UE 215 may include a first panel 220 (e.g., a first antenna panel, antenna array, or antenna sub-array) and a second panel 225 (e.g., a second antenna panel, antenna array, or antenna sub-array) for communications between UE 215 and the first TRP 205 and between UE 215 and the second TRP 210, respectively.

In some cases, problems with power consumption may arise when UE 215 is configured to operate in the multi-TRP mode. For example, when configured for the multi-TRP mode, in some instances one TRP may have information to communicate with UE 215 (e.g., one TRP may transmit a PDCCH and corresponding PDSCH). For example, one or more TRPs may refrain from transmitting a PDCCH and corresponding PDSCH depending on a buffer status, channel status, or the like. However, UE 215 may monitor the control channels (e.g., PDCCH) from all TRPs associated with the multi-TRP mode. For example, UE 215 may turn on the first panel 220 and the second panel 225 (e.g., all antenna panels and radio frequency (RF) components) to monitor the control channels when configured for multi-TRP mode operations. This operation may increase battery power consumption at UE 215.

Accordingly, aspects of the present disclosure provide for a dynamic PDCCH monitoring status change while UE 215 is configured to operate in the multi-TRP mode. For example, UE 215 may be semi-statically configured to operate in the single-TRP mode or the multi-TRP mode, (e.g., using RRC signaling, a MAC CE, or the like). UE 215 may be configured to support two (or more) control channel monitoring states that may be changed dynamically (e.g., via a MAC CE, a DCI, based on a timer, or the like).

One example may include a first control channel monitoring state (e.g., a single-TRP PDCCH monitoring status) where one of the TRPs in the multi-TRP cluster (e.g., the first TRP 205) may be configured as a master TRP, and where UE 215 monitors the control channel (e.g., for PDCCH) transmitted by the master TRP. In the first control channel monitoring state, UE 215 may skip monitoring a control channel (e.g., for PDCCH) from other TRPs (e.g., such as from the second TRP 210). In some examples, UE 215 may turn off the second panel 225 associated with the second TRP 210 to skip monitoring.

In another example, UE 215 may be configured to operate in a second control channel monitoring state (e.g., a multi-TRP PDCCH monitoring status), where UE 215 may monitor the control channels (e.g., for PDCCH transmissions) from each TRP, for example, from the first TRP 205 and the second TRP 210.

In some instances where there are more than two serving TRPs in the multi-TRP cluster, the number of control channel monitoring states may be increased. As one example, there may be three TRPs (e.g., TRP 1, TRP 2, and TRP 3) in the multi-TRP cluster, and a first control channel monitoring state may be configured such that TRP 1 may be on (e.g., TRP 1=on), TRP 2 may be off (e.g., TRP 2=off), and TRP 3 may be off (e.g., TRP 3=off), a second control channel monitoring state may be configured as TRP 1=on, TRP 2=on, and TRP 3=off, and a third control channel monitoring state may be configured as TRP 1=on, TRP 2=on, and TRP 3=on, where "on" and "off" may refer to whether or not UE 215 monitors the respective control channel for the respective TRP. It is to be understood that other configurations for the control channel monitoring states may be utilized.

In some aspects, the control channel monitoring state may be changed in a dynamic manner when UE 215 is configured to operate in the multi-TRP mode. For example, UE 215 may identify an indication to switch from the first control channel monitoring state to the second control channel monitoring state of the multi-TRP mode, or vice versa. Broadly, the indication may be a dynamic indication based on signaling and/or based on a timer associated with a respective control channel monitoring state. For example, wireless communications system 200 may illustrate one example where the indication to switch is signaling-based.

Wireless communications system 200-a of FIG. 2A illustrates an example where UE 215 may be configured to operate in a first control channel monitoring state of a multi-TRP mode, where the UE 215 may monitor a first control channel of the first TRP 205. For example, UE 215 may utilize the first panel 220 to monitor the first control channel (e.g., the control channel associated with the first TRP 205) for a first control channel signal (e.g., PDCCH 1) and/or a first data channel signal (e.g., PDSCH 1) from the first TRP 205. In some examples, UE 215 may turn off the second panel 225 while operating in the first control channel monitoring state of the multi-TRP mode.

UE 215 may determine or otherwise identify an indication to switch from the first control channel monitoring state to a second control channel monitoring state of the multi-TRP mode. UE 215 may identify the indication to switch dynamically, for example, based on dynamic signaling received from the first TRP 205. For example, the first TRP 205 may transmit (and UE 215 may receive) a DCI and/or a MAC CE that carries or otherwise conveys the indication for UE 215 to switch from the first control channel monitoring state to the second control channel monitoring state. In some examples, any DCI carrying a grant from the first TRP 205 may provide or otherwise convey the indication to switch to the second control channel monitoring state. In some examples, a format of the DCI and/or MAC CE (e.g., one or more bits, fields, etc.) may be selected or otherwise designed to carry or convey the indication to switch to the second control channel monitoring state.

In some examples, the signaling used to trigger the switch from the first control channel monitoring state to the second control channel monitoring state may be implicit. In some examples, the first TRP 205 may determine to change a bandwidth used for communications with UE 215. For example, the first TRP 205 may transmit a DCI configured to change a bandwidth part (BWP) used for communicating with UE 215 (e.g., the first TRP 205 may transmit a BWP switching DCI). Accordingly, UE 215 may receive a BWP switching DCI from the first TRP 205 that carries or otherwise conveys an indication of a change in the BWP. UE 215 may interpret the BWP switching DCI as an indication to switch from the first control channel monitoring mode to the second control channel monitoring mode, or vice versa. In some cases, utilizing the BWP switching DCI may conserve resources of the first TRP 205 and/or UE 215.

In some examples, a BWP may be related or otherwise correspond to a control channel monitoring state. For example, a first BWP may correspond to the first control channel monitoring state while a second BWP may correspond to the second control channel monitoring state. Accordingly, UE 215 may switch between the first control channel monitoring state and the second control channel monitoring state, or vice versa, based on which BWP is configured by the first TRP 205.

In some examples, there may be no pairing or correlation between the configured BWP and the control channel monitoring state. Accordingly, any BWP may be used in conjunction with the first control channel monitoring state and/or the second control channel monitoring state. In this example, the change from one BWP to the next BWP may signal or otherwise convey the indication to switch between the control channel monitoring states.

Wireless communications system 200-b of FIG. 2B illustrates an example where UE 215 may switch (e.g., based on a signaling-based indication to switch or based on a timer), from the first control channel monitoring state to the second control channel monitoring state where UE 215 is configured to monitor the first control channel of the first TRP 205 (e.g., PDCCH 1, and the corresponding PDSCH 1) and to monitor a second control channel of the second TRP 210 (e.g., PDCCH 2, and the corresponding PDSCH 2). For example, UE 215 may use the first panel 220 to monitor the first control channel of the first TRP 205 and may use the second panel 225 to monitor the second control channel of the second TRP 210.

In some aspects, UE 215 may provide an indication to the first TRP 205 and/or the second TRP 210 that UE 215 has switched from the first control channel monitoring state to the second control channel monitoring state, or vice versa. In some examples, UE 215 may indicate the switching by transmitting or otherwise providing an acknowledgment/negative-acknowledgment (ACK/NACK) signal to the first TRP 205 and the second TRP 210. The ACK/NACK signal may carry or otherwise convey an indication that UE 215 has switched to the second control channel monitoring state. When switching from the second control channel monitoring state to the first control channel monitoring state, UE 215 may similarly transmit an ACK/NACK signal to the first TRP 205.

In some aspects, UE 215 may switch back to the first control channel monitoring state after switching to the second control monitoring state based on identifying a subsequent indication to switch. For example, the subsequent identification may be based on a subsequent DCI and/or MAC CE received from the first TRP 205 and/or the second TRP 210 that may carry or otherwise convey the indication to switch from the second control channel monitoring state to the first control channel monitoring state. As described in greater detail with reference to FIGS. 3A and 3B, the subsequent indication to switch may be based on a timer associated with the second control channel monitoring state.

Aspects of the present disclosure provide a mechanism where UE 215 may utilize multiple control channel monitoring states while operating or otherwise configured in a multi-TRP mode. UE 215 may switch between the control channel monitoring states dynamically (e.g., as needed) in order to conserve power when one or more of the configured TRPs are not performing active communications with UE 215. The number and/or configuration of the control channel monitoring states may be based on the number of TRPs configured or otherwise associated with UE 215. The control channel monitoring state that UE 215 operates in for any given instance may be controlled dynamically to conserve resources (e.g., power resources) when one or more TRPs are not communicating with UE 215.

Figure 3A:
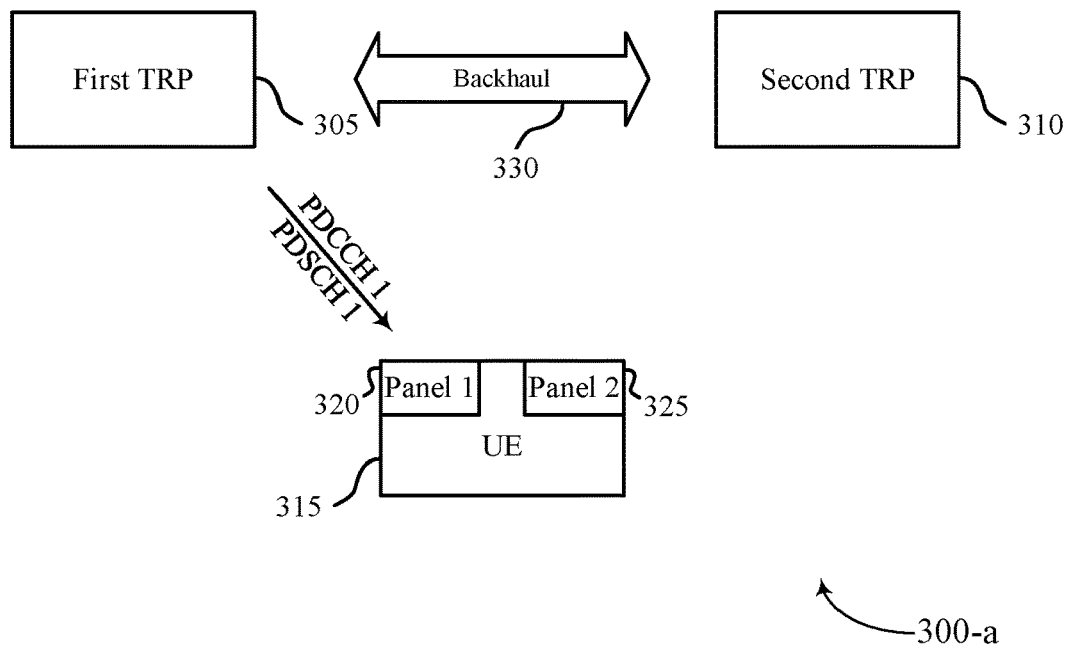
FIGS. 3A and 3B respectively illustrate examples of a wireless communication system that supports techniques for switching control channel monitoring for multi-TRP in accordance with various aspects of the present disclosure.
Figure 3B:
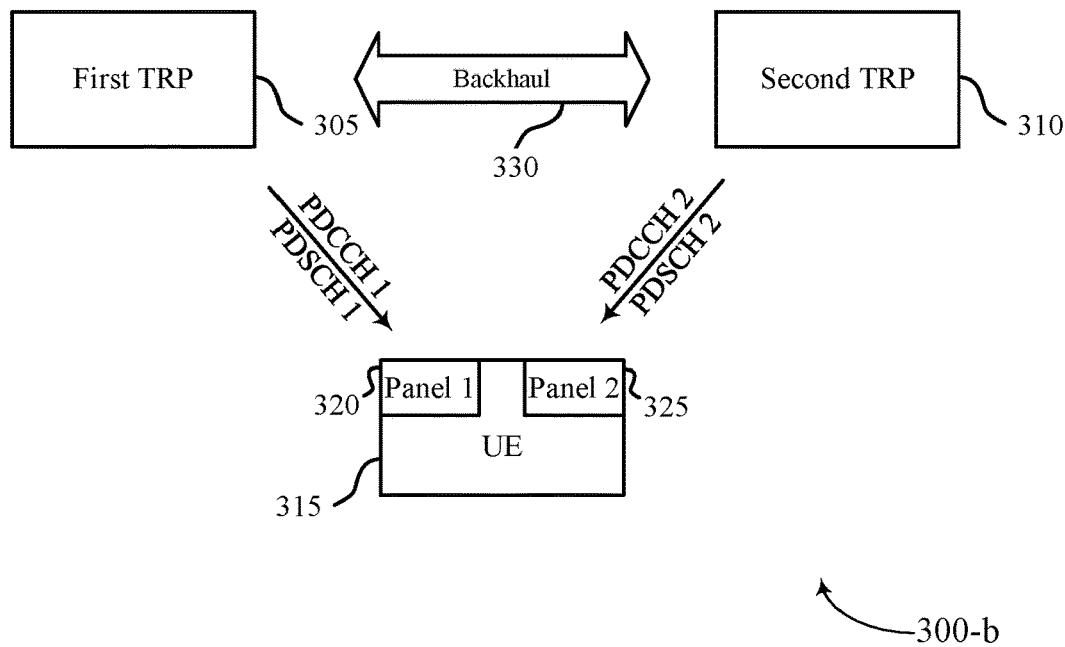

FIGS. 3A and 3B respectively illustrate examples of a wireless communications system 300-a and a wireless communications system 300-b that support techniques for switching control channel monitoring for multi-TRP in accordance with various aspects of the present disclosure. In some examples, a wireless communications system 300 may implement aspects of wireless communications systems 100 and/or 200. Aspects of a wireless communications system 300 may include a first TRP 305, a second TRP 310, and a UE 315, which may be examples of the corresponding devices described herein. In some cases, the first TRP 305 and the second TRP 310 may be connected or may otherwise communicate via a backhaul link 330. For example, wireless communications system 300 may be similar to wireless communications system 200, but illustrates an example where switching between a first control channel monitoring state and a second control channel monitoring state may be timer-based.

As described herein, aspects of the present disclosure provide for a dynamic change in PDCCH monitoring status when UE 315 is configured to operate in a multi-TRP mode. For example, UE 315 may be semi-statically configured to operate in a single-TRP mode or the multi-TRP mode (e.g., using RRC signaling, a MAC CE, or the like). UE 315 may be configured to support two (or more) control channel monitoring states that may be changed dynamically (e.g., via a MAC CE, a DCI, based on the timer, or the like).

Accordingly and with reference to wireless communications system 300-a of FIG. 3A, UE 315 may be configured or otherwise operate in a first control channel monitoring state while operating in a multi-TRP mode. When operating in the first control channel monitoring state, UE 315 may monitor a first control channel of the first TRP 305 (e.g., monitoring for a PDCCH 1, and a corresponding PDSCH 1) using a first panel 320 (e.g., a first antenna panel, or antenna array, or antenna sub-array). In some examples, UE 315 may turn off a second panel 325 while operating in the first control channel monitoring state.

UE 315 may determine or otherwise identify an indication to switch from the first control channel monitoring state to a second control channel monitoring state of the multi-TRP mode. In the example illustrated in wireless communications system 300, UE 315 may identify the indication to switch, at least in some aspects, based on a timer. For example, UE 315 may initiate or otherwise start a timer associated with the first control channel monitoring state. When the timer expires (e.g., upon expiry of a timer duration of the timer), UE 315 may switch from the first control channel monitoring state to a second control channel monitoring state.

Accordingly, in some examples, the dynamic control channel monitoring state switch in the multi-TRP mode may be triggered by a timer. The timer-based switch may be applied when switching from the first control channel monitoring state to the second control channel monitoring state, or vice versa. UE 315 may start a timer when changing between control channel monitoring states based on signaling (e.g., a DCI and/or MAC CE, as described with reference to wireless communications system 200). When the timer expires, UE 315 may switch back to an original control channel monitoring state (e.g., a control channel monitoring state used by UE 315 before changing).

A time duration may be configured according to aspects of the present disclosure. For example, the time duration may be configured dynamically (e.g., a DCI and/or MAC CE conveying an indication to switch control channel monitoring states may also carry or convey an indication of the time duration). The dynamic configuration may allow the first TRP 305 to dynamically control a timer duration based on a channel status, a buffer status, or the like. In some examples, the timer duration may be configured semi-statically (e.g., using RRC signaling). When operating in the first control channel monitoring state (e.g., where UE 315 monitors the control channel of the first TRP 305), UE 315 may receive the indication of the timer duration from the first TRP 305. When operating in the second control channel monitoring state (e.g., where UE 315 monitors the control channels of the first TRP 305 and the second TRP 310), UE 315 may receive the indication for of the timer duration from either or both of the first TRP 305 and the second TRP 310.

In some aspects, the timer may be configured to restart upon occurrence of one or more events, such as when receiving any grant bearing DCI from a TRP (e.g., receiving any DCI carrying a grant from the second TRP 310 while operating in the second control channel monitoring state). As described herein, aspects of the timer-based approach providing the indication to switch between the control channel monitoring states may be combined with the signaling-based approach described with reference to wireless communications system 200.

Wireless communications system 300-b of FIG. 3B illustrates an example where UE 315 may switch, based on the timer-based indication, from the first control channel monitoring state to the second control channel monitoring state, where UE 315 may be configured to monitor the first control channel of the first TRP 305 (e.g., PDCCH 1, and the corresponding PDSCH 1) and to monitor a second control channel of the second TRP 310 (e.g., PDCCH 2, and the corresponding PDSCH 2). For example, UE 315 may use the first panel 320 to monitor the first control channel of the first TRP 305 and may use the second panel 325 to monitor the second control channel of the second TRP 310.

In some aspects, UE 315 may provide an indication to the first TRP 305 and/or the second TRP 310 that UE 315 has switched from the first control channel monitoring state to the second control channel monitoring state. For example, UE 315 may transmit an ACK/NACK signal to the first TRP 305 and/or the second TRP 310 that may carry or otherwise convey an indication that UE 315 has switched to the second control channel monitoring state.

In some aspects, UE 315 may switch back from the second control channel monitoring state to the first control channel monitoring state based on identifying a subsequent indication to switch. For example, the subsequent identification may be based on expiration of the timer as described herein, which may convey the indication to switch from the second control channel monitoring state to the first control channel monitoring state. For example, the subsequent indication to switch may be based on the timer associated with the second control channel monitoring state.

Accordingly, aspects of the present disclosure provide a mechanism where UE 315 may utilize multiple control channel monitoring states while operating or otherwise configured in a multi-TRP mode. UE 315 may switch between the control channel monitoring states dynamically (e.g., as needed) in order to conserve power when one or more of the configured TRPs are not performing active communications with UE 315. A number and/or configuration of the control channel monitoring states may be based on a number of TRPs configured or otherwise associated with UE 315.

Figure 4:
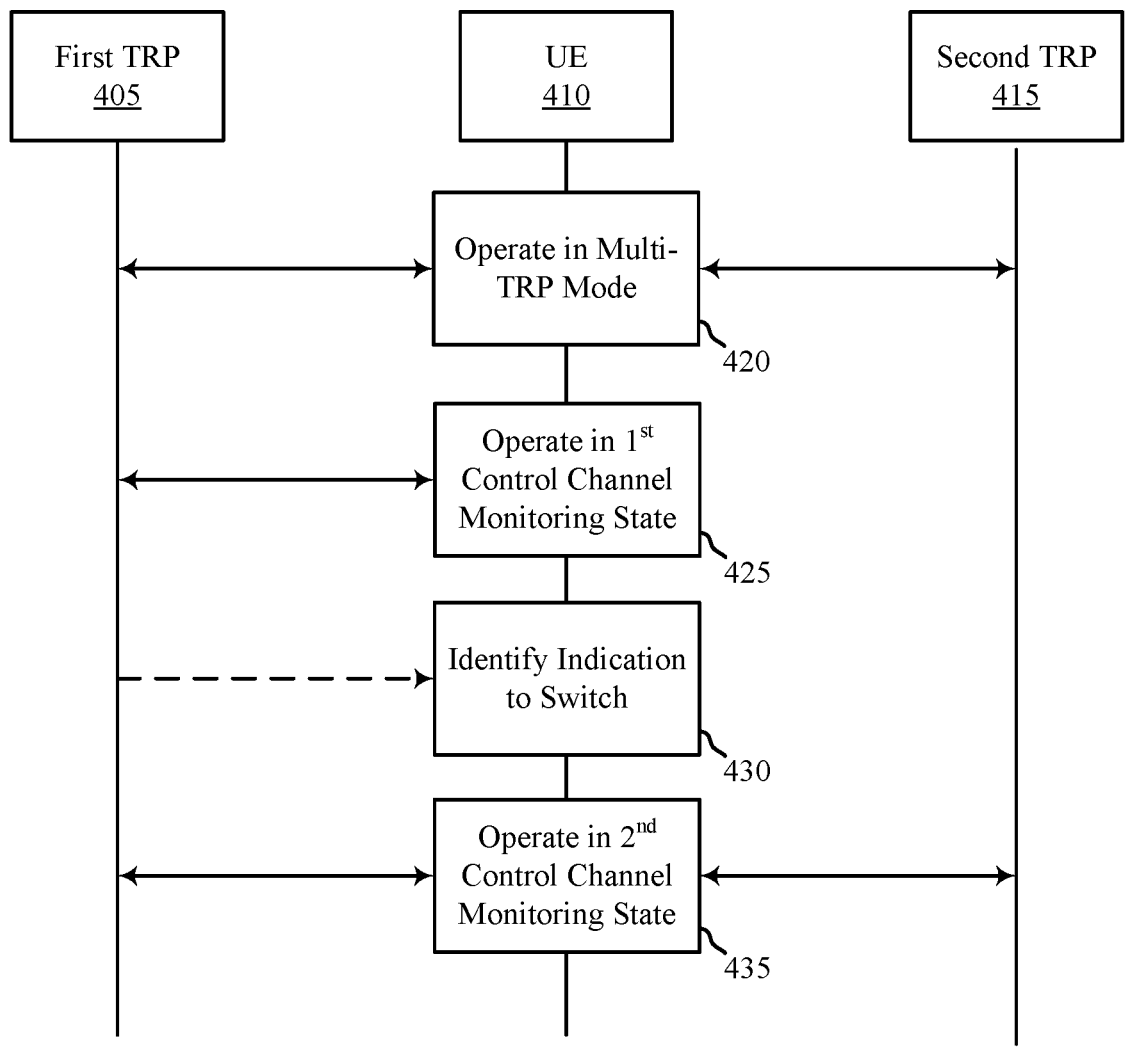
FIG. 4 illustrates an example of a process flow that supports techniques for switching control channel monitoring for multi-TRP in accordance with various aspects of the present disclosure.

FIG. 4 illustrates an example of a process flow 400 that supports techniques for switching control channel monitoring for multi-TRP in accordance with various aspects of the present disclosure. In some examples, process flow 400 may implement aspects of wireless communications systems 100, 200, and/or 300. Aspects of process flow 400 may be implemented by a first TRP 405, a UE 410, and/or a second TRP 415, which may be examples of the corresponding devices described herein.

At 420, UE 410 may be configured to operate in a multi-TRP mode, where the UE may monitor control channels from different TRPs. For example, UE 410 may be semi-statically configured to operate in the multi-TRP mode based on receiving an RRC and/or MAC CE from the first TRP 405 (e.g., the master TRP in a multi-TRP configuration).

At 425, UE 410 may operate in a first control channel monitoring state of the multi-TRP mode, where UE 410 may be configured to monitor a first control channel of the first TRP 405. In some aspects, when operating in the first control channel monitoring state, UE 410 may receive and/or transmit control and/or data signals between UE 410 and the first TRP 405.

At 430, UE 410 may determine or otherwise identify an indication to switch from the first control channel monitoring state to a second control channel monitoring state of the multi-TRP mode. In some aspects, identifying the indication to switch may include the first TRP 405 transmitting (and UE 410 receiving) a DCI and/or MAC CE that carries or conveys the indication for UE 410 to switch to the second control channel monitoring state. In some aspects, identifying the indication to switch may include UE 410 initiating a timer associated with the first control channel monitoring state and switching to the second control channel monitoring state upon expiration of the timer (e.g., upon expiry of a timer duration associated with timer). In some aspects, the first TRP 405 and/or the second TRP 415 may transmit or otherwise provide an indication of the duration of the timer. In some aspects, identifying the indication to switch may include the first TRP 405 transmitting (and UE 410 receiving) a BWP switching DCI that carries or otherwise conveys an indication to switch to the second control channel monitoring state.

At 435, UE 410 may switch, based on the indication, to the second control channel monitoring state, where UE 410 may monitor the first control channel of the first TRP 405 and monitor a second control channel of the second TRP 415. In some aspects, UE 410 may transmit or otherwise provide an indication to the first TRP 405 and/or the second TRP 415 that UE 410 has switched to the second control channel monitoring state, (e.g., using an ACK/NACK signal).

In some aspects, UE 410 may switch back from the second control channel monitoring state to the first control channel monitoring state. For example, UE 410 may identify a subsequent indication to switch back to the first control channel monitoring state. The subsequent indication may be signaling-based (e.g., based on a DCI and/or MAC CE) and/or based on a timer associated with the second control channel monitoring state. As described herein, the first TRP 405 and/or the second TRP 415 may transmit or otherwise provide an indication of the timer duration to UE 410.

Figure 5:
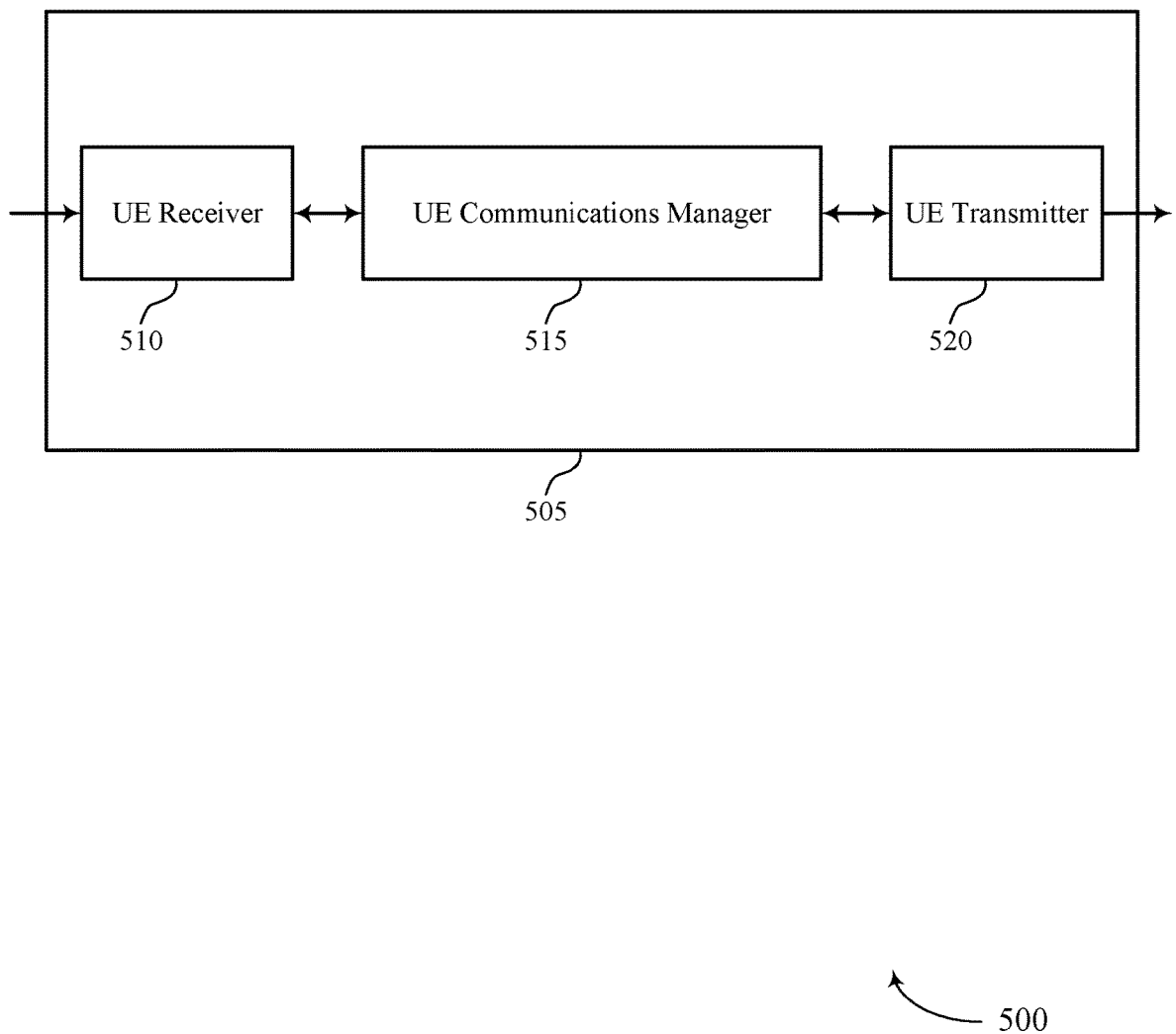
FIG. 5 shows a block diagram of a device that supports techniques for switching control channel monitoring for multi-TRP in accordance with various aspects of the present disclosure.

FIG. 5 shows a block diagram 500 of a device 505 that supports techniques for switching control channel monitoring for multi-TRP in accordance with various aspects of the present disclosure. The device 505 may be an example of aspects of a UE (e.g., a UE 115, a UE 215, a UE 315, or a UE 410) as described herein. The device 505 may include a UE receiver 510, a UE communications manager 515, and a UE transmitter 520. The device 505 may also include a processor. Each of these components may be in communication with one another (e.g., via one or more buses).

The UE receiver 510 may receive information such as packets, user data, or control information associated with various information channels (e.g., control channels, data channels, and information related to techniques for switching control channel monitoring for multi-TRP, etc.). Information may be passed on to other components of the device 505. The UE receiver 510 may be an example of aspects of the UE transceiver 820 described with reference to FIG. 8. The UE receiver 510 may utilize a single antenna or a set of antennas.

The UE communications manager 515 may operate, by the UE, in a multi-TRP mode, where the multi-TRP mode includes monitoring a set of control channels and each of the set of control channels is associated with a TRP. The UE communications manager 515 may also operate in a first control channel monitoring state of the multi-TRP mode where the UE is configured to monitor a first control channel of a first TRP, identify an indication to switch from the first control channel monitoring state to a second control channel monitoring state of the multi-TRP mode, and switch, based on the indication, to the second control channel monitoring state where the UE is configured to monitor the first control channel of the first TRP and monitor a second control channel of a second TRP. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The UE transmitter 520 may transmit signals generated by other components of the device 505. In some examples, the UE transmitter 520 may be collocated with a UE receiver 510 in a transceiver component. For example, the UE transmitter 520 may be an example of aspects of the UE transceiver 820 described with reference to FIG. 8. The UE transmitter 520 may utilize a single antenna or a set of antennas.

The actions performed by the UE communications manager 515 as described herein may be implemented to realize one or more potential advantages. For example, UE communications manager 515 may increase efficient resource use and decrease power consumption at a UE by enabling the UE to switch between control channel monitoring states in a multi-TRP mode, thereby decreasing power consumption at the UE that may result from monitoring one or more control channels that are devoid of communications. UE communications manager 515 may save power and increase battery life at a UE by strategically reducing a number of control channels simultaneously monitored by the UE.

Figure 6:
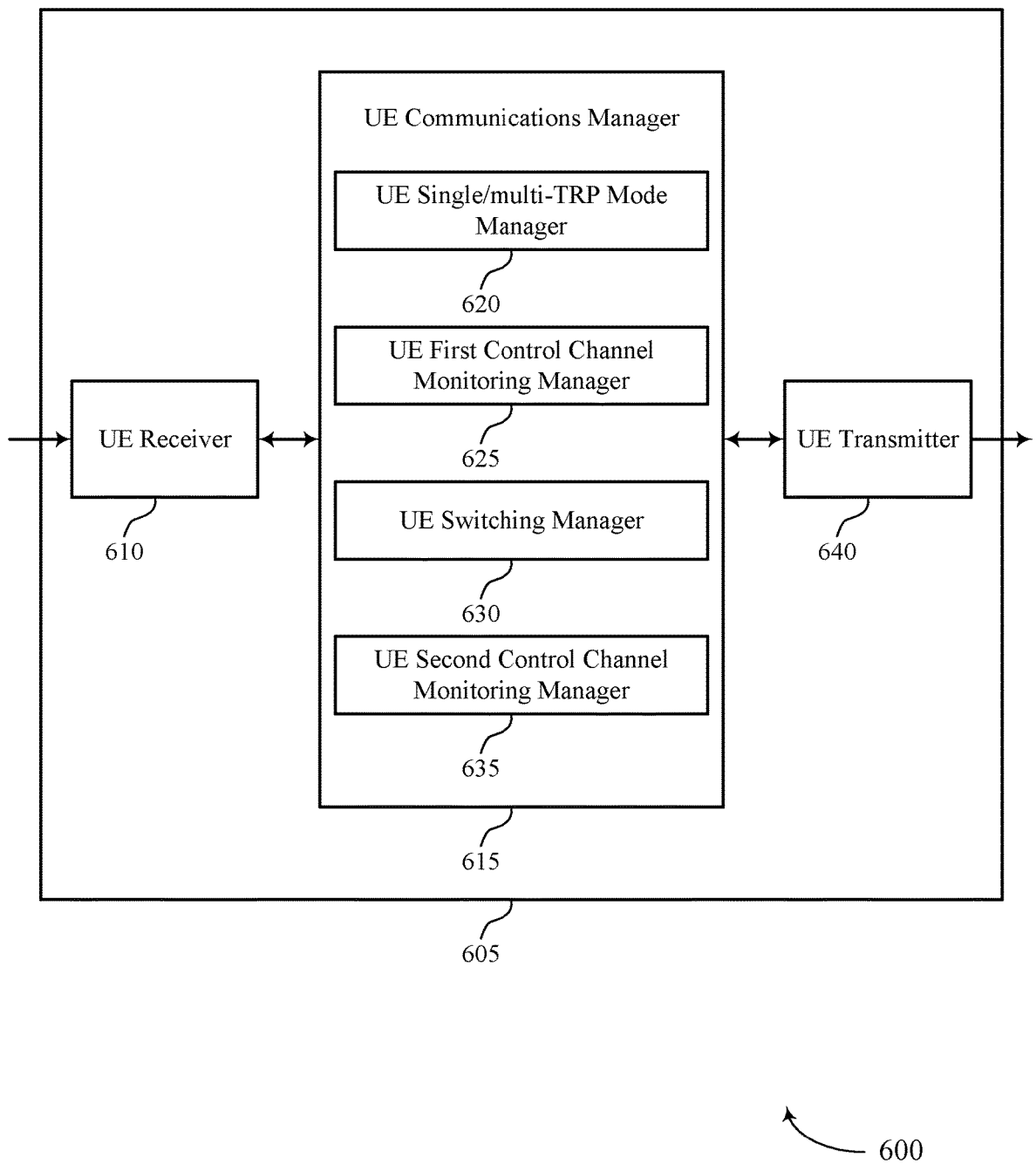
FIG. 6 shows a block diagram of a device that supports techniques for switching control channel monitoring for multi-TRP in accordance with various aspects of the present disclosure.

FIG. 6 shows a block diagram 600 of a device 605 that supports techniques for switching control channel monitoring for multi-TRP in accordance with various aspects of the present disclosure. The device 605 may be an example of aspects of a device 505, or a UE (e.g., a UE 115, a UE 215, a UE 315, or a UE 410) as described herein. The device 605 may include a UE receiver 610, a UE communications manager 615, and a UE transmitter 640. The device 605 may also include a processor. Each of these components may be in communication with one another (e.g., via one or more buses).

The UE receiver 610 may receive information such as packets, user data, or control information associated with various information channels (e.g., control channels, data channels, and information related to techniques for switching control channel monitoring for multi-TRP, etc.). Information may be passed on to other components of the device 605. The UE receiver 610 may be an example of aspects of the UE transceiver 820 described with reference to FIG. 8. The UE receiver 610 may utilize a single antenna or a set of antennas.

The UE communications manager 615 may be an example of aspects of the UE communications manager 515 as described herein. The UE communications manager 615 may include a UE single/multi-TRP mode manager 620, a UE first control channel monitoring manager 625, a UE switching manager 630, and a UE second control channel monitoring manager 635. The UE communications manager 615 may be an example of aspects of the UE communications manager 810 described herein.

The UE single/multi-TRP mode manager 620 may operate, by the UE, in a multi-TRP mode, where the multi-TRP mode includes monitoring a set of control channels and each of the set of control channels is associated with a TRP.

The UE first control channel monitoring manager 625 may operate in a first control channel monitoring state of the multi-TRP mode where the UE is configured to monitor a first control channel of a first TRP.

The UE switching manager 630 may identify an indication to switch from the first control channel monitoring state to a second control channel monitoring state of the multi-TRP mode.

The UE second control channel monitoring manager 635 may switch, based on the indication, to the second control channel monitoring state where the UE is configured to monitor the first control channel of the first TRP and monitor a second control channel of a second TRP.

The UE transmitter 640 may transmit signals generated by other components of the device 605. In some examples, the UE transmitter 640 may be collocated with a UE receiver 610 in a transceiver component. For example, the UE transmitter 640 may be an example of aspects of the UE transceiver 820 described with reference to FIG. 8. The UE transmitter 640 may utilize a single antenna or a set of antennas.

A processor of a UE (e.g., controlling the UE receiver 610, the UE transmitter 640, or the UE transceiver 820 as described with reference to FIG. 8) may increase efficient resource use and decrease power consumption by enabling the UE to switch between control channel monitoring states in a multi-TRP mode, which may decrease power consumption at the UE that may result from monitoring one or more control channels that are devoid of communications (e.g., via implementation of system components described with reference to FIG. 7). Further, the processor of the UE may identify one or more aspects of a control channel monitoring state and an indication to switch control channel monitoring states to perform the processes described herein. The processor of the UE may identify the indication to switch control channel monitoring states and may switch control channel monitoring states for the UE to save power and increase battery life at the UE (e.g., by strategically reducing a number of control channels simultaneously monitored by the UE).

Figure 7:
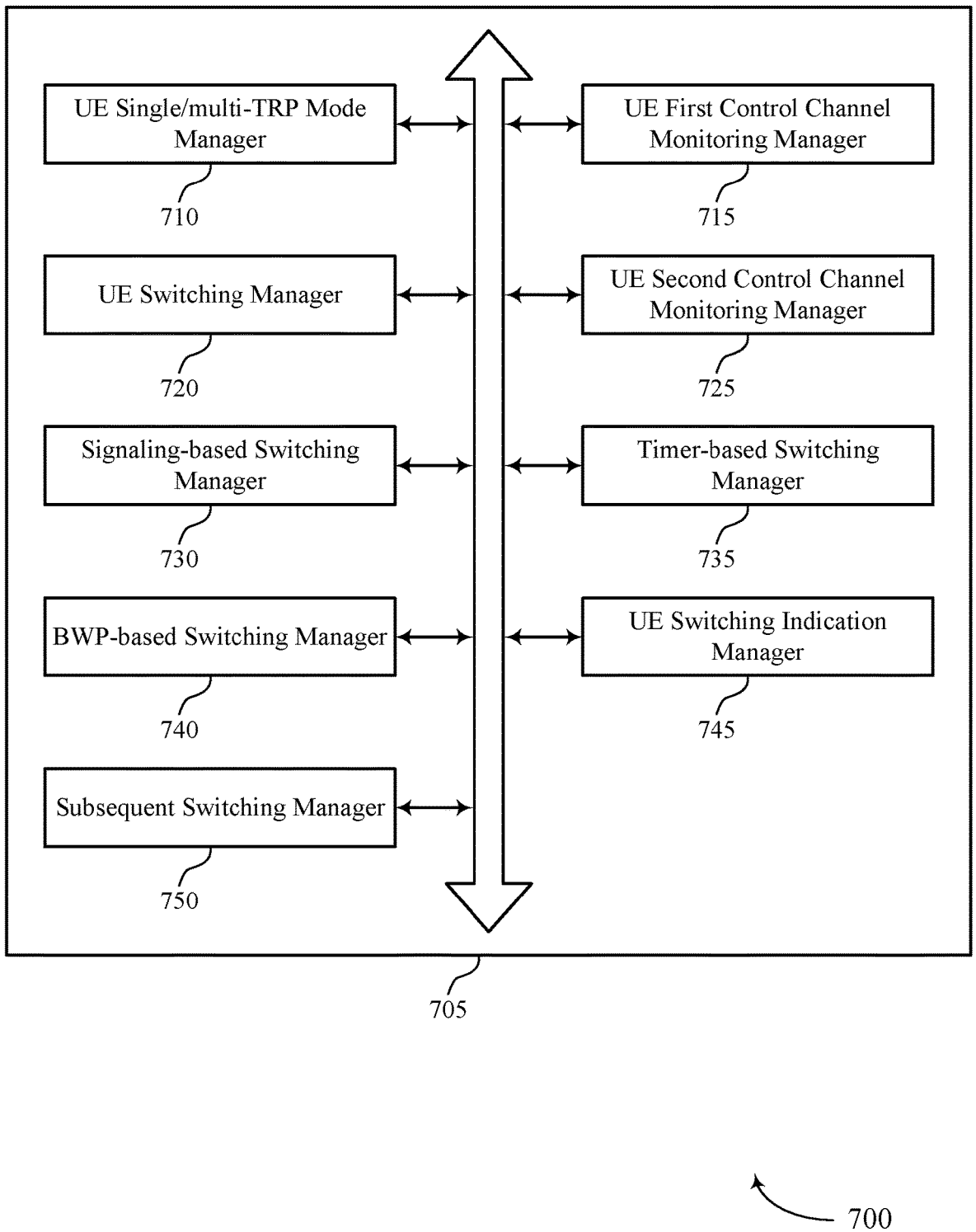
FIG. 7 shows a block diagram of a user equipment (UE) communications manager that supports techniques for switching control channel monitoring for multi-TRP in accordance with various aspects of the present disclosure.

FIG. 7 shows a block diagram 700 of a UE communications manager 705 that supports techniques for switching control channel monitoring for multi-TRP in accordance with various aspects of the present disclosure. The UE communications manager 705 may be an example of aspects of a UE communications manager 515, a UE communications manager 615, or a UE communications manager 810 described herein. The UE communications manager 705 may include a UE single/multi-TRP mode manager 710, a UE first control channel monitoring manager 715, a UE switching manager 720, a UE second control channel monitoring manager 725, a signaling-based UE switching manager 730, a timer-based UE switching manager 735, a BWP-based UE switching manager 740, a UE switching indication manager 745, and a subsequent UE switching manager 750. Each of these components may communicate, directly or indirectly, with one another (e.g., via one or more buses).

The UE single/multi-TRP mode manager 710 may operate, by the UE, in a multi-TRP mode, where the multi-TRP mode includes monitoring a set of control channels and each of the set of control channels is associated with a TRP.

The UE first control channel monitoring manager 715 may operate in a first control channel monitoring state of the multi-TRP mode where the UE is configured to monitor a first control channel of a first TRP.

The UE switching manager 720 may identify an indication to switch from the first control channel monitoring state to a second control channel monitoring state of the multi-TRP mode.

The UE second control channel monitoring manager 725 may switch, based on the indication, to the second control channel monitoring state where the UE is configured to monitor the first control channel of the first TRP and monitor a second control channel of a second TRP.

The signaling-based UE switching manager 730 may receive, from the first TRP, at least one of a DCI signal, a MAC CE signal, or a combination thereof, indicating for the UE to switch to the second control channel monitoring state.

The timer-based UE switching manager 735 may initiate, based on identifying the indication, a timer associated with the first control channel monitoring state. In some examples, the timer-based UE switching manager 735 may switch, upon expiry of a timer duration associated with the timer, from the first control channel monitoring state to the second control channel monitoring state. In some examples, the timer-based UE switching manager 735 may receive, from the first TRP, the second TRP, or a combination thereof, at least one of a DCI, a MAC CE, an RRC signal, or a combination thereof, indicating the timer duration.

The BWP-based UE switching manager 740 may receive, from the first TRP, a BWP switching DCI indicating a change in the BWP associated with the first TRP, where receiving the BWP switching DCI includes the indication.

The UE switching indication manager 745 may transmit, based on the switching to the second control channel monitoring state, an ACK/NACK signal to the first TRP and the second TRP indicating that the UE has switched to the second control channel monitoring state.

The subsequent UE switching manager 750 may identify a subsequent indication to switch from the second control channel monitoring state to the first control channel monitoring state. In some examples, the subsequent UE switching manager 750 may switch, based on the subsequent indication, from the second control channel monitoring state to the first control channel monitoring state. In some examples, the subsequent UE switching manager 750 may receive, from the first TRP or the second TRP, at least one of a DCI signal, a MAC CE signal, or a combination thereof, indicating for the UE to switch to the first control channel monitoring state. In some examples, the subsequent UE switching manager 750 may initiate, upon switching to the second control channel monitoring state, a timer associated with the second control channel monitoring state. In some examples, the subsequent UE switching manager 750 may switch, upon expiry of the timer, to the first control channel monitoring state.

Figure 8:
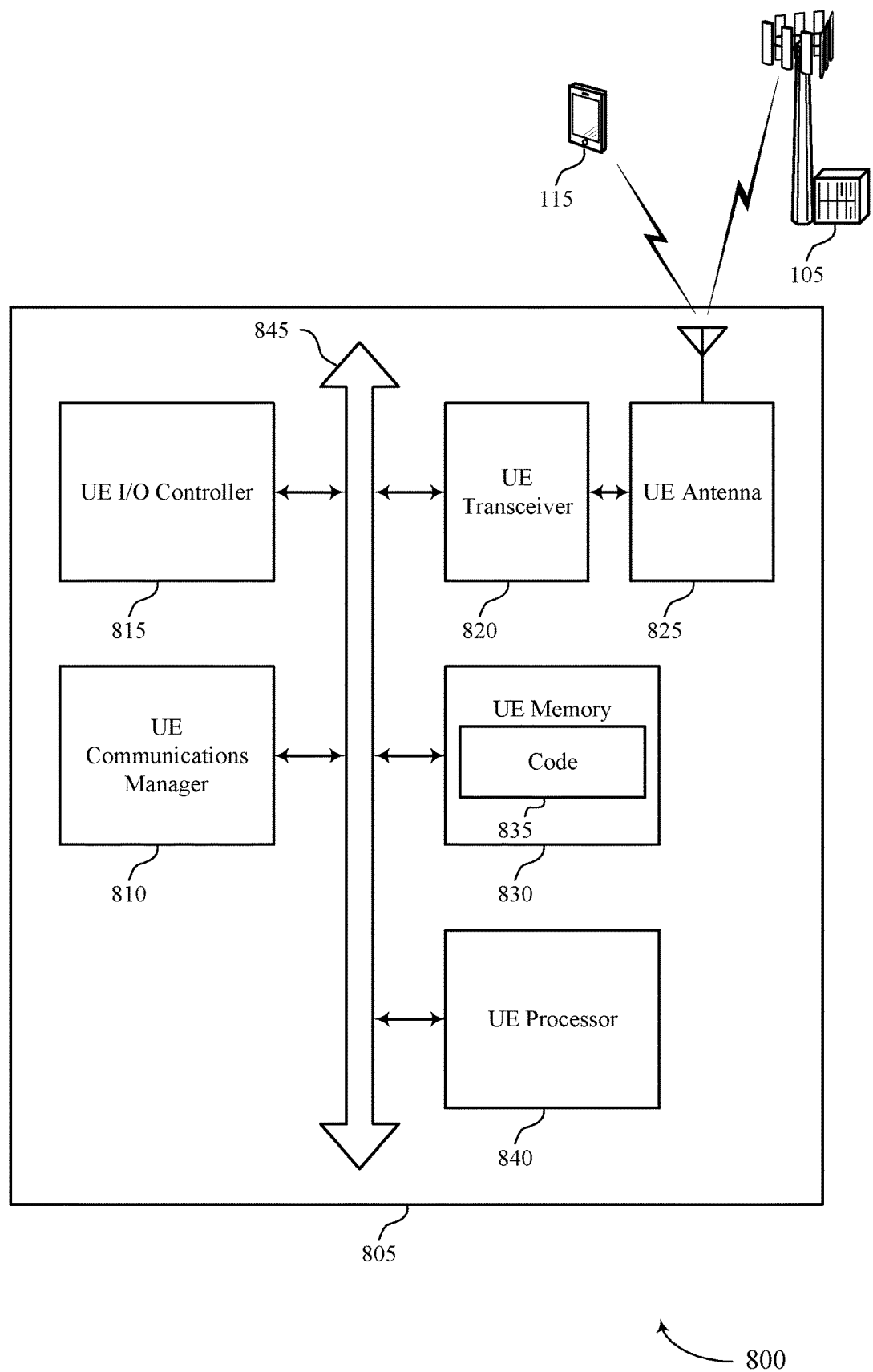
FIG. 8 shows a diagram of a system including a device that supports techniques for switching control channel monitoring for multi-TRP in accordance with various aspects of the present disclosure.

FIG. 8 shows a diagram of a system 800 including a device 805 that supports techniques for switching control channel monitoring for multi-TRP in accordance with various aspects of the present disclosure. The device 805 may be an example of or include the components of device 505, device 605, or a UE (e.g., a UE 115, a UE 215, a UE 315, or a UE 410) as described herein. The device 805 may include components for bi-directional voice and data communications including components for transmitting and receiving communications, including a UE communications manager 810, an UE I/O controller 815, a UE transceiver 820, an UE antenna 825, UE memory 830, and a UE processor 840. These components may be in electronic communication via one or more buses (e.g., bus 845).

The UE communications manager 810 may operate, by the UE, in a multi-TRP mode, where the multi-TRP mode includes monitoring a set of control channels and each of the set of control channels is associated with a TRP. The UE communications manager 810 may also operate in a first control channel monitoring state of the multi-TRP mode where the UE is configured to monitor a first control channel of a first TRP, identify an indication to switch from the first control channel monitoring state to a second control channel monitoring state of the multi-TRP mode, and switch, based on the indication, to the second control channel monitoring state where the UE is configured to monitor the first control channel of the first TRP and monitor a second control channel of a second TRP.

The UE I/O controller 815 may manage input and output signals for the device 805. The UE I/O controller 815 may also manage peripherals not integrated into the device 805. In some cases, the UE I/O controller 815 may represent a physical connection or port to an external peripheral. In some cases, the UE I/O controller 815 may utilize an operating system such as iOS®, ANDROID®, MS-DOS®, MS-WINDOWS®, OS/2®, UNIX®, LINUX®, or another known operating system. In other cases, the UE I/O controller 815 may represent or interact with a modem, a keyboard, a mouse, a touchscreen, or a similar device. In some cases, the UE I/O controller 815 may be implemented as part of a processor. In some cases, a user may interact with the device 805 via the UE I/O controller 815 or via hardware components controlled by the UE I/O controller 815.

The UE transceiver 820 may communicate bi-directionally, via one or more antennas, wired, or wireless links as described above. For example, the UE transceiver 820 may represent a wireless transceiver and may communicate bi-directionally with another wireless transceiver. The UE transceiver 820 may also include a modem to modulate the packets and provide the modulated packets to the antennas for transmission, and to demodulate packets received from the antennas.

In some cases, the wireless device may include a single UE antenna 825. However, in some cases the device may have more than one UE antenna 825, which may be capable of concurrently transmitting or receiving multiple wireless transmissions.

The UE memory 830 may include random access memory (RAM) and read only memory (ROM). The UE memory 830 may store computer-readable, computer-executable code 835 including instructions that, when executed, cause the processor to perform various functions described herein. In some cases, the UE memory 830 may contain, among other things, a basic I/O system (BIOS) which may control basic hardware or software operation such as the interaction with peripheral components or devices.

The UE processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the UE processor 840 may be configured to operate a memory array using a memory controller. In other cases, a memory controller may be integrated into the UE processor 840. The UE processor 840 may be configured to execute computer-readable instructions stored in a memory (e.g., the UE memory 830) to cause the device 805 to perform various functions (e.g., functions or tasks supporting techniques for switching control channel monitoring for multi-TRP).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the UE processor 840 but may cause a computer (e.g., when compiled and executed) to perform functions described herein.

Figure 9:
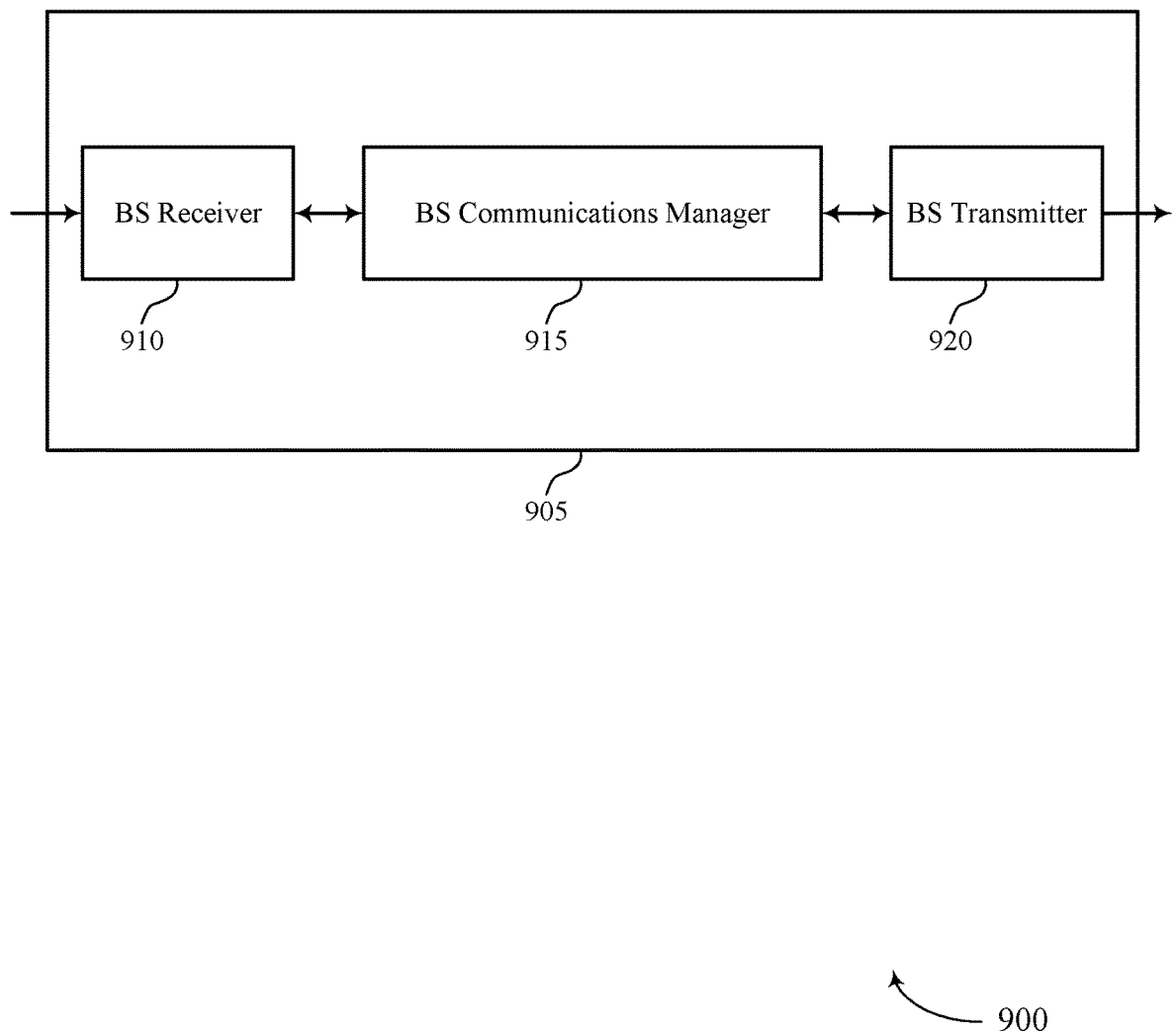
FIG. 9 shows a block diagram of a device that supports techniques for switching control channel monitoring for multi-TRP in accordance with various aspects of the present disclosure.

FIG. 9 shows a block diagram 900 of a device 905 that supports techniques for switching control channel monitoring for multi-TRP in accordance with various aspects of the present disclosure. The device 905 may be an example of aspects of a base station 105 as described herein. The device 905 may include a BS receiver 910, a base station (BS) communications manager 915, and a BS transmitter 920. The device 905 may also include a processor. Each of these components may be in communication with one another (e.g., via one or more buses).

The BS receiver 910 may receive information such as packets, user data, or control information associated with various information channels (e.g., control channels, data channels, and information related to techniques for switching control channel monitoring for multi-TRP, etc.). Information may be passed on to other components of the device 905. The BS receiver 910 may be an example of aspects of the BS transceiver 1220 described with reference to FIG. 12. The BS receiver 910 may utilize a single antenna or a set of antennas.

The BS communications manager 915 may operate, with a UE, in a multi-TRP mode, the multi-TRP mode including the UE configured to monitor a set of control channels and each of the set of control channels is associated with a TRP. The BS communications manager 915 may also operate, with the UE, in a first control channel monitoring state of the multi-TRP mode where the UE is configured to monitor a first control channel of the first TRP, transmit a signal to the UE indicating that the UE is to switch from the first control channel monitoring state to a second control channel monitoring state of the multi-TRP mode, and operate, with the UE and based on the signal, in the second control channel monitoring state where the UE is configured to monitor the first control channel of the first TRP and monitor a second control channel of a second TRP. The BS communications manager 915 may be an example of aspects of the BS communications manager 1210 described herein.

The BS communications manager 915, or its sub-components, may be implemented in hardware, code (e.g., software or firmware) executed by a processor, or any combination thereof. If implemented in code executed by a processor, the functions of the BS communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The BS communications manager 915, or its sub-components, may be physically located at various positions, including being distributed such that portions of functions are implemented at different physical locations by one or more physical components. In some examples, the BS communications manager 915, or its sub-components, may be a separate and distinct component in accordance with various aspects of the present disclosure. In some examples, the BS communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The BS transmitter 920 may transmit signals generated by other components of the device 905. In some examples, the BS transmitter 920 may be collocated with a BS receiver 910 in a transceiver component. For example, the BS transmitter 920 may be an example of aspects of the BS transceiver 1220 described with reference to FIG. 12. The BS transmitter 920 may utilize a single antenna or a set of antennas.

Figure 10:
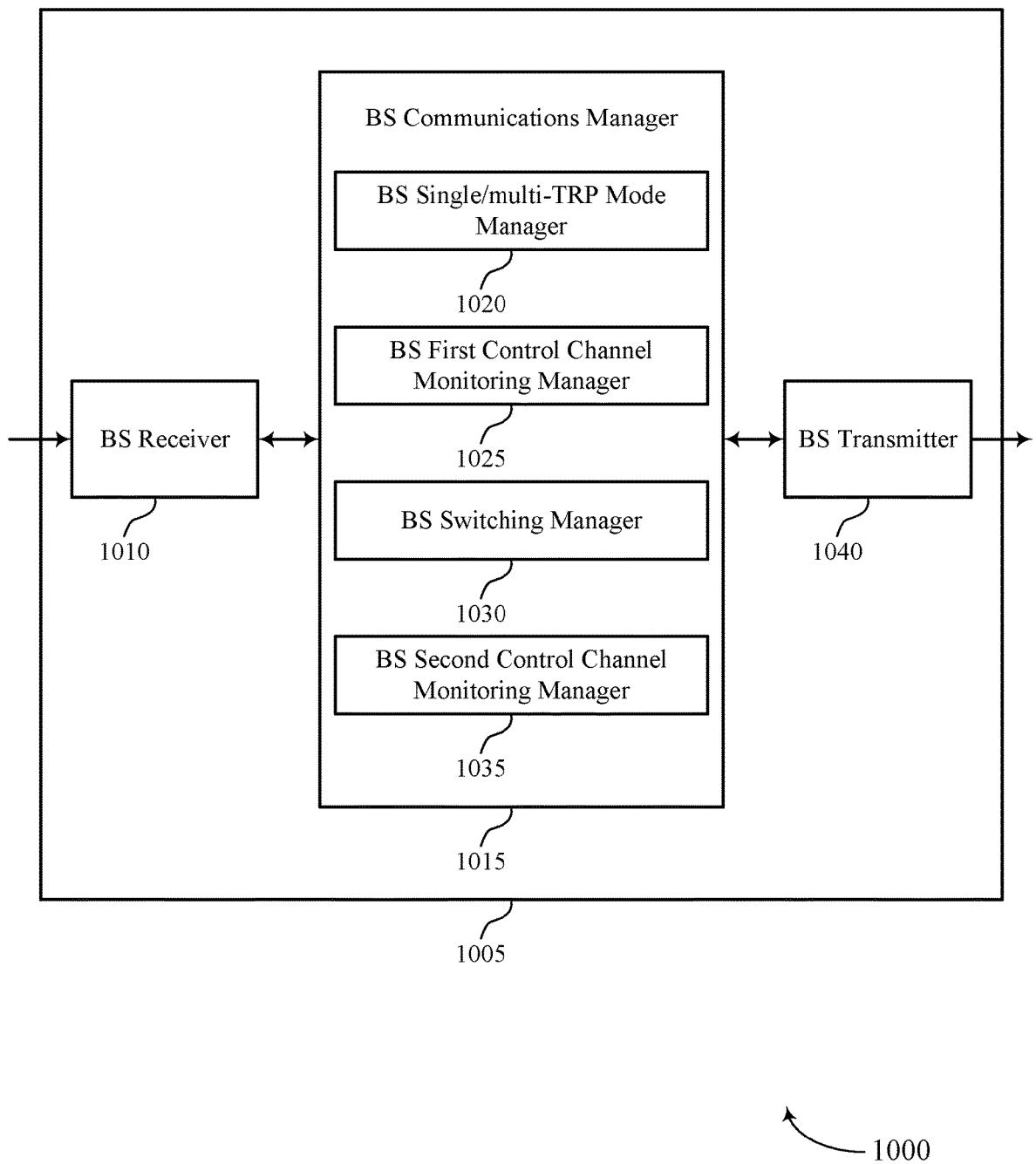
FIG. 10 shows a block diagram of a device that supports techniques for switching control channel monitoring for multi-TRP in accordance with various aspects of the present disclosure.

FIG. 10 shows a block diagram 1000 of a device 1005 that supports techniques for switching control channel monitoring for multi-TRP in accordance with various aspects of the present disclosure. The device 1005 may be an example of aspects of a device 905, or a base station 105 as described herein. The device 1005 may include a BS receiver 1010, a BS communications manager 1015, and a BS transmitter 1040. The device 1005 may also include a processor. Each of these components may be in communication with one another (e.g., via one or more buses).

The BS receiver 1010 may receive information such as packets, user data, or control information associated with various information channels (e.g., control channels, data channels, and information related to techniques for switching control channel monitoring for multi-TRP, etc.). Information may be passed on to other components of the device 1005. The BS receiver 1010 may be an example of aspects of the BS transceiver 1220 described with reference to FIG. 12. The BS receiver 1010 may utilize a single antenna or a set of antennas.

The BS communications manager 1015 may be an example of aspects of the BS communications manager 915 as described herein. The BS communications manager 1015 may include a BS single/multi-TRP mode manager 1020, a BS first control channel monitoring manager 1025, a BS switching manager 1030, and a BS second control channel monitoring manager 1035. The BS communications manager 1015 may be an example of aspects of the BS communications manager 1210 described herein.

The BS single/multi-TRP mode manager 1020 may operate, with a UE, in a multi-TRP mode, the multi-TRP mode including the UE configured to monitor a set of control channels and each of the set of control channels is associated with a TRP.

The BS first control channel monitoring manager 1025 may operate, with the UE, in a first control channel monitoring state of the multi-TRP mode where the UE is configured to monitor a first control channel of the first TRP.

The BS switching manager 1030 may transmit a signal to the UE indicating that the UE is to switch from the first control channel monitoring state to a second control channel monitoring state of the multi-TRP mode.

The BS second control channel monitoring manager 1035 may operate, with the UE and based on the signal, in the second control channel monitoring state where the UE is configured to monitor the first control channel of the first TRP and monitor a second control channel of a second TRP.

The BS transmitter 1040 may transmit signals generated by other components of the device 1005. In some examples, the BS transmitter 1040 may be collocated with a BS receiver 1010 in a transceiver component. For example, the BS transmitter 1040 may be an example of aspects of the BS transceiver 1220 described with reference to FIG. 12. The BS transmitter 1040 may utilize a single antenna or a set of antennas.

Figure 11:
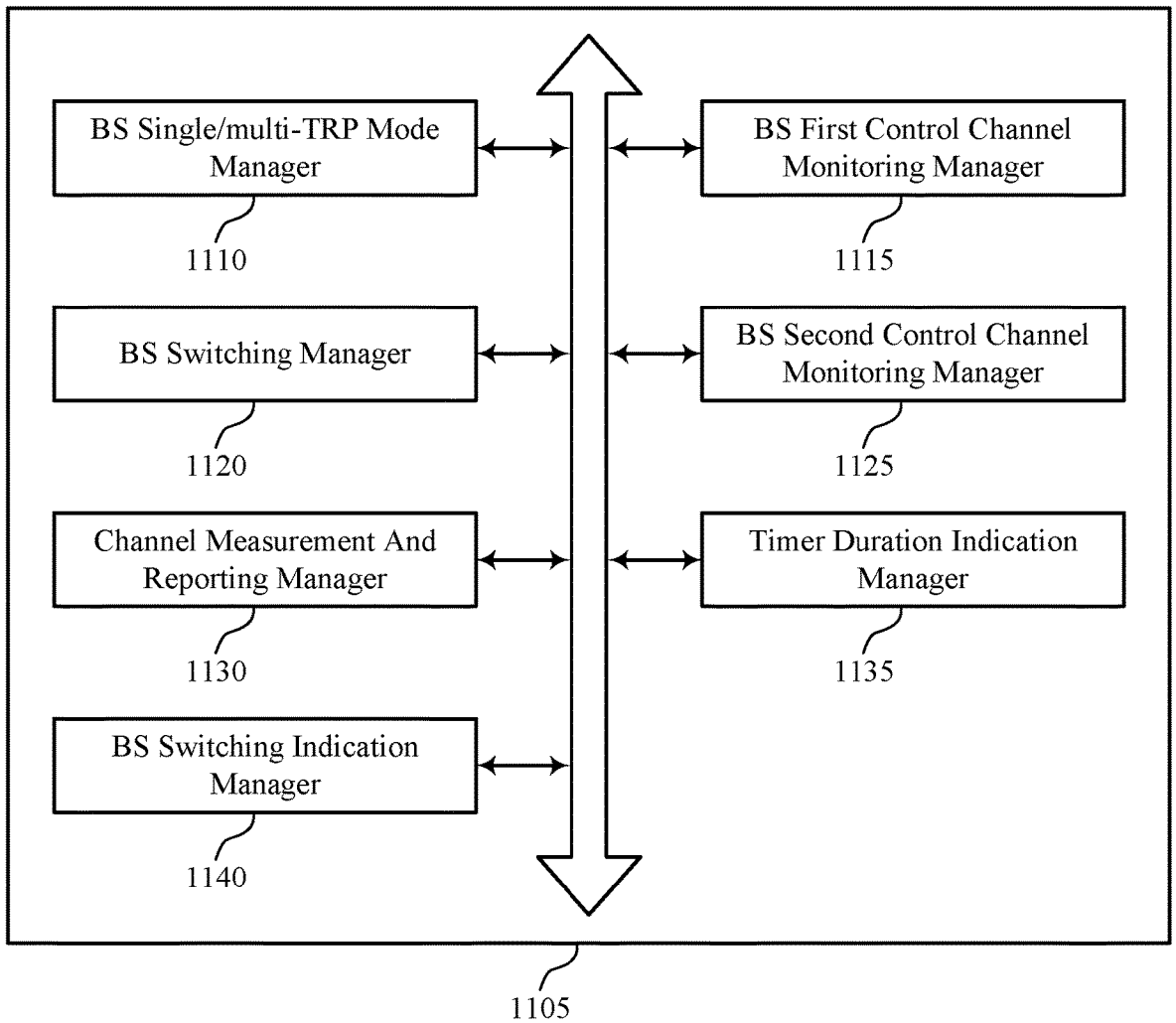
FIG. 11 shows a block diagram of a base station (BS) communications manager that supports techniques for switching control channel monitoring for multi-TRP in accordance with various aspects of the present disclosure.

FIG. 11 shows a block diagram 1100 of a BS communications manager 1105 that supports techniques for switching control channel monitoring for multi-TRP in accordance with various aspects of the present disclosure. The BS communications manager 1105 may be an example of aspects of a BS communications manager 915, a BS communications manager 1015, or a BS communications manager 1210 described herein. The BS communications manager 1105 may include a BS single/multi-TRP mode manager 1110, a BS first control channel monitoring manager 1115, a BS switching manager 1120, a BS second control channel monitoring manager 1125, a channel measurement and reporting manager 1130, a timer duration indication manager 1135, and a BS switching indication manager 1140. Each of these components may communicate, directly or indirectly, with one another (e.g., via one or more buses).

The BS single/multi-TRP mode manager 1110 may operate, with a UE, in a multi-TRP mode, the multi-TRP mode including the UE configured to monitor a set of control channels and each of the set of control channels is associated with a TRP.

The BS first control channel monitoring manager 1115 may operate, with the UE, in a first control channel monitoring state of the multi-TRP mode where the UE is configured to monitor a first control channel of the first TRP.

The BS switching manager 1120 may transmit a signal to the UE indicating that the UE is to switch from the first control channel monitoring state to a second control channel monitoring state of the multi-TRP mode. In some cases, the signal includes at least one of a DCI, a MAC CE, a BWP switching DCI, or a combination thereof. In some cases, the BS switching manager 1120 may transmit, to the UE, at least one of a DCI signal, a MAC CE signal, or a combination thereof, indicating for the UE to switch from the second control channel monitoring state to the first control channel monitoring state.

The BS second control channel monitoring manager 1125 may operate, with the UE and based on the signal, in the second control channel monitoring state where the UE is configured to monitor the first control channel of the first TRP and monitor a second control channel of a second TRP.

The channel measurement and reporting manager 1130 may receive, from the UE and while operating in the first control channel monitoring state, a channel performance measurement report indicating a result of a channel performance measurement using one or more signals from the first TRP.

The timer duration indication manager 1135 may transmit, in the signal, an indication of a timer duration for a timer associated with the first control channel monitoring state, the second control channel monitoring state, or a combination thereof.

The BS switching indication manager 1140 may receive an ACK/NACK signal from the UE indicating that the UE has switched to the second control channel monitoring state.

Figure 12:
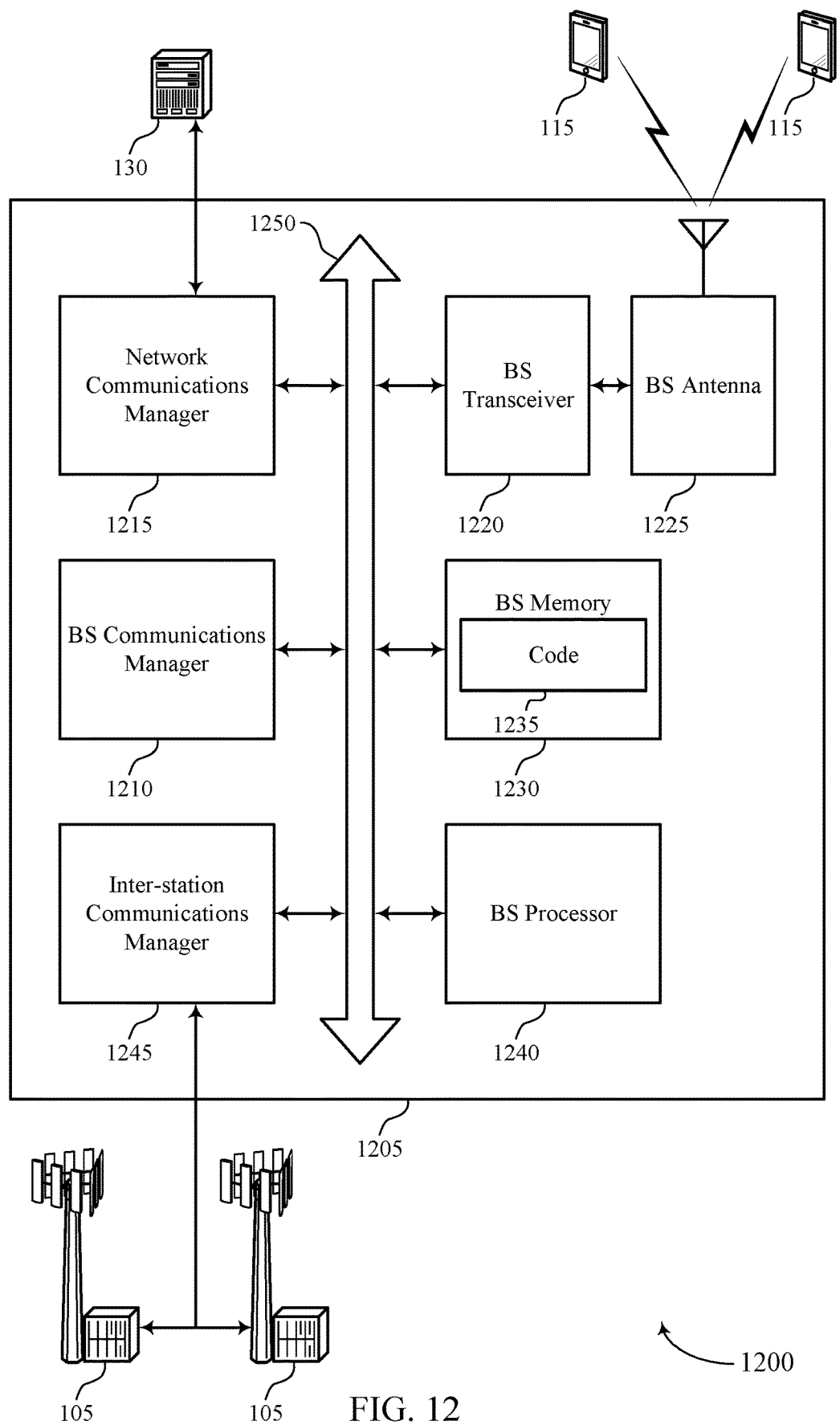
FIG. 12 shows a diagram of a system including a device that supports techniques for switching control channel monitoring for multi-TRP in accordance with various aspects of the present disclosure.

FIG. 12 shows a diagram of a system 1200 including a device 1205 that supports techniques for switching control channel monitoring for multi-TRP in accordance with various aspects of the present disclosure. The device 1205 may be an example of or include the components of device 905, device 1005, or a base station 105 as described herein. The device 1205 may include components for bi-directional voice and data communications including components for transmitting and receiving communications, including a BS communications manager 1210, a network communications manager 1215, a BS transceiver 1220, an BS antenna 1225, BS memory 1230, a BS processor 1240, and an inter-station communications manager 1245. These components may be in electronic communication via one or more buses (e.g., bus 1250).

The BS communications manager 1210 may operate, with a UE, in a multi-TRP mode, the multi-TRP mode including the UE configured to monitor a set of control channels and each of the set of control channels is associated with a TRP. The BS communications manager 1210 may also operate, with the UE, in a first control channel monitoring state of the multi-TRP mode where the UE is configured to monitor a first control channel of the first TRP, transmit a signal to the UE indicating that the UE is to switch from the first control channel monitoring state to a second control channel monitoring state of the multi-TRP mode, and operate, with the UE and based on the signal, in the second control channel monitoring state where the UE is configured to monitor the first control channel of the first TRP and monitor a second control channel of a second TRP.

The network communications manager 1215 may manage communications with the core network (e.g., via one or more wired backhaul links). For example, the network communications manager 1215 may manage the transfer of data communications for client devices, such as one or more UEs 115.

The BS transceiver 1220 may communicate bi-directionally, via one or more antennas, wired, or wireless links as described above. For example, the BS transceiver 1220 may represent a wireless transceiver and may communicate bi-directionally with another wireless transceiver. The BS transceiver 1220 may also include a modem to modulate the packets and provide the modulated packets to the antennas for transmission, and to demodulate packets received from the antennas.

In some cases, the wireless device may include a single BS antenna 1225. However, in some cases the device may have more than one BS antenna 1225, which may be capable of concurrently transmitting or receiving multiple wireless transmissions.

The BS memory 1230 may include RAM, ROM, or a combination thereof. The BS memory 1230 may store computer-readable code 1235 including instructions that, when executed by a processor (e.g., the BS processor 1240) cause the device to perform various functions described herein. In some cases, the BS memory 1230 may contain, among other things, a BIOS which may control basic hardware or software operation such as the interaction with peripheral components or devices.

The BS processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the BS processor 1240 may be configured to operate a memory array using a memory controller. In some cases, a memory controller may be integrated into BS processor 1240. The BS processor 1240 may be configured to execute computer-readable instructions stored in a memory (e.g., the BS memory 1230) to cause the device 1205 to perform various functions (e.g., functions or tasks supporting techniques for switching control channel monitoring for multi-TRP).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the BS processor 1240 but may cause a computer (e.g., when compiled and executed) to perform functions described herein.

Figure 13:
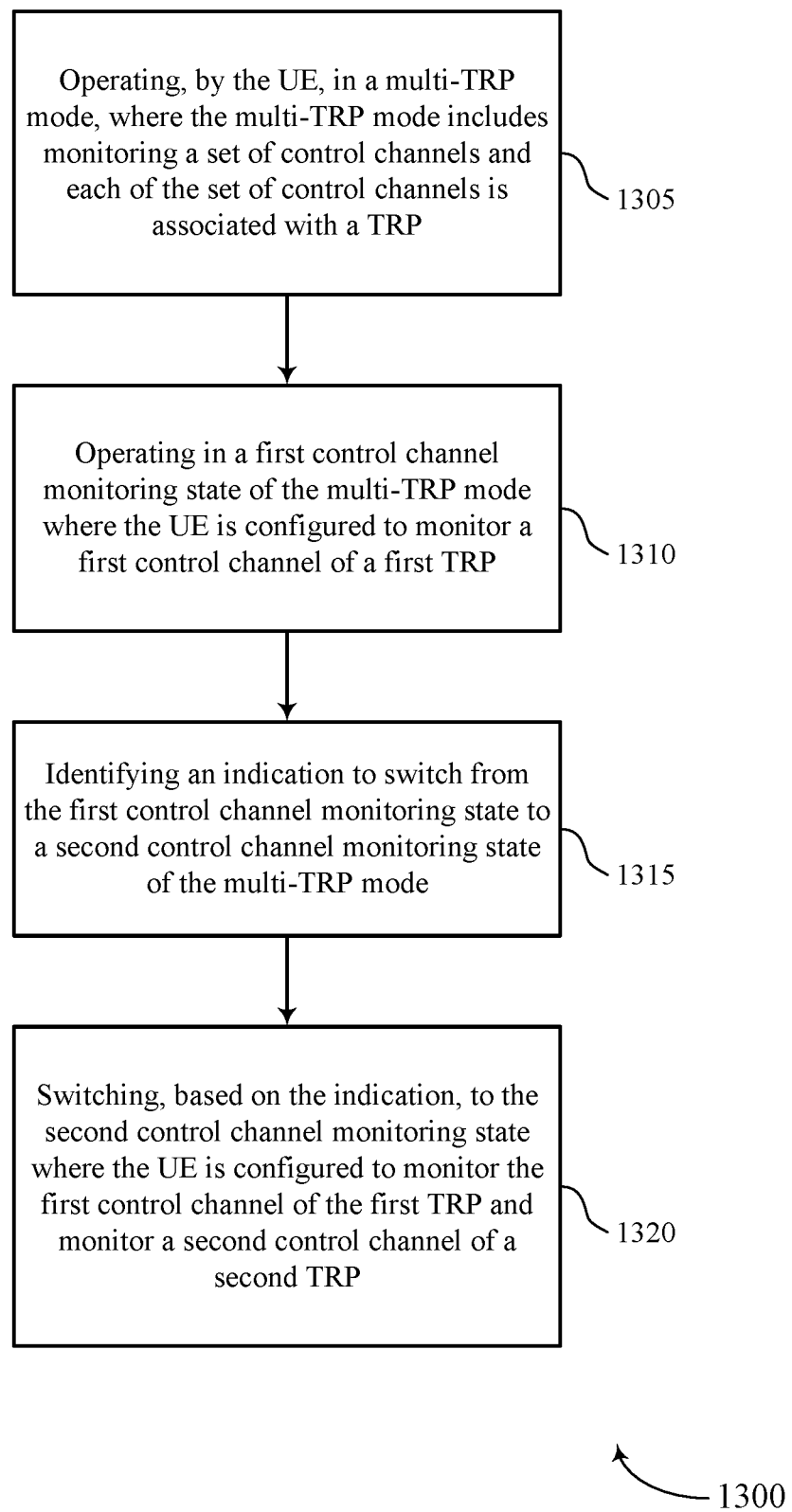
FIG. 13 shows a flowchart illustrating a method that supports techniques for switching control channel monitoring for multi-TRP in accordance with various aspects of the present disclosure.

FIG. 13 shows a flowchart illustrating a method 1300 that supports techniques for switching control channel monitoring for multi-TRP in accordance with various aspects of the present disclosure. The operations of method 1300 may be implemented by a UE (e.g., a UE 115, a UE 215, a UE 315, or a UE 410) or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may operate, by the UE, in a multi-TRP mode, where the multi-TRP mode includes monitoring a set of control channels and each of the set of control channels is associated with a TRP. The operations of 1305 may be performed according to the methods described herein. In some examples, aspects of the operations of 1305 may be performed by a single/multi-TRP mode manager as described with reference to FIGS. 5 through 8.

At 1310, the UE may operate in a first control channel monitoring state of the multi-TRP mode where the UE is configured to monitor a first control channel of a first TRP. The operations of 1310 may be performed according to the methods described herein. In some examples, aspects of the operations of 1310 may be performed by a first control channel monitoring manager as described with reference to FIGS. 5 through 8.

At 1315, the UE may identify an indication to switch from the first control channel monitoring state to a second control channel monitoring state of the multi-TRP mode. The operations of 1315 may be performed according to the methods described herein. In some examples, aspects of the operations of 1315 may be performed by a switching manager as described with reference to FIGS. 5 through 8.

At 1320, the UE may switch, based on the indication, to the second control channel monitoring state where the UE is configured to monitor the first control channel of the first TRP and monitor a second control channel of a second TRP. The operations of 1320 may be performed according to the methods described herein. In some examples, aspects of the operations of 1320 may be performed by a second control channel monitoring manager as described with reference to FIGS. 5 through 8.

Figure 14:
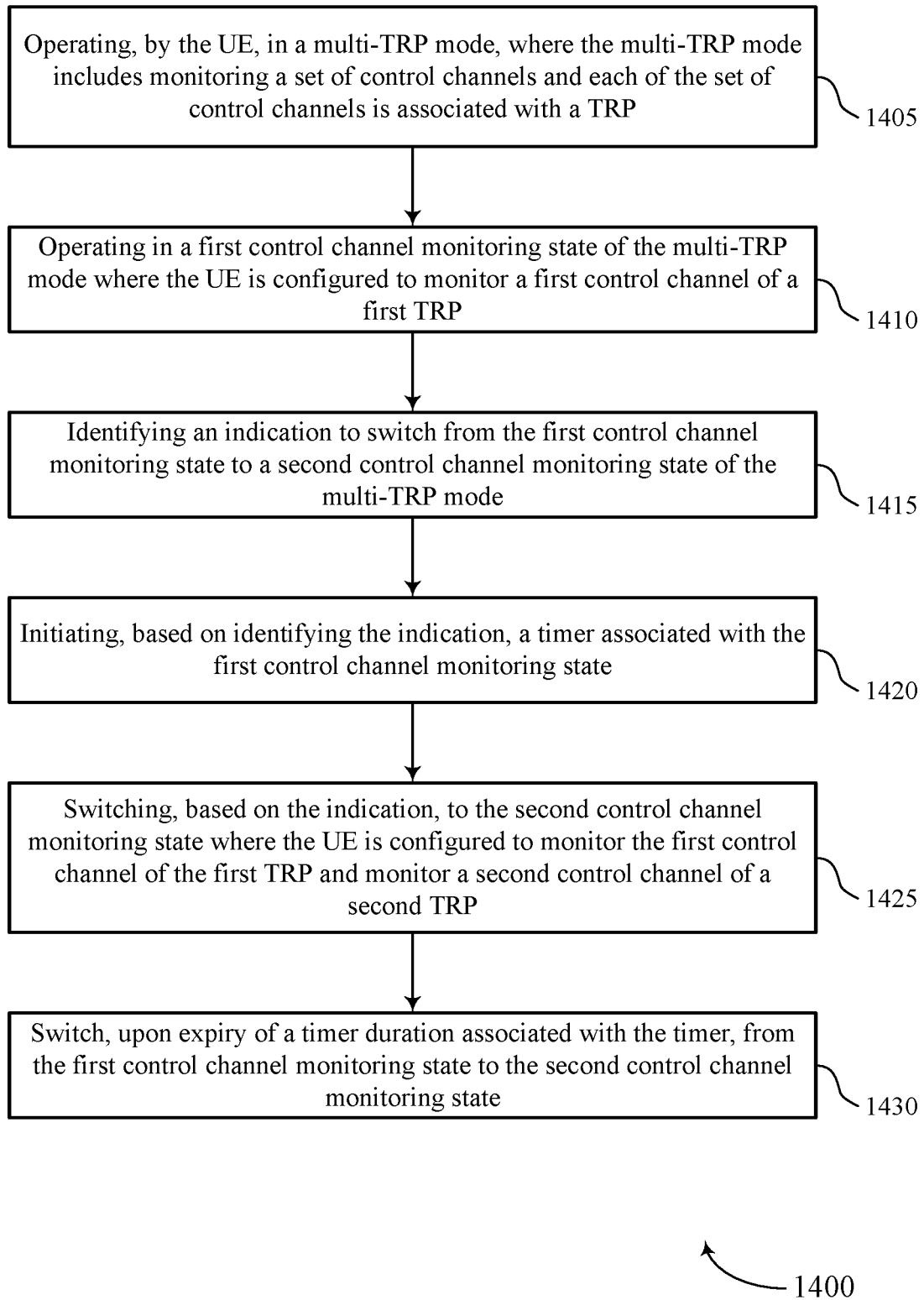
FIG. 14 shows a flowchart illustrating a method that supports techniques for switching control channel monitoring for multi-TRP in accordance with various aspects of the present disclosure.

FIG. 14 shows a flowchart illustrating a method 1400 that supports techniques for switching control channel monitoring for multi-TRP in accordance with various aspects of the present disclosure. The operations of method 1400 may be implemented by a UE (e.g., a UE 115, a UE 215, a UE 315, or a UE 410) or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may operate, by the UE, in a multi-TRP mode, where the multi-TRP mode includes monitoring a set of control channels and each of the set of control channels is associated with a TRP. The operations of 1405 may be performed according to the methods described herein. In some examples, aspects of the operations of 1405 may be performed by a single/multi-TRP mode manager as described with reference to FIGS. 5 through 8.

At 1410, the UE may operate in a first control channel monitoring state of the multi-TRP mode where the UE is configured to monitor a first control channel of a first TRP. The operations of 1410 may be performed according to the methods described herein. In some examples, aspects of the operations of 1410 may be performed by a first control channel monitoring manager as described with reference to FIGS. 5 through 8.

At 1415, the UE may identify an indication to switch from the first control channel monitoring state to a second control channel monitoring state of the multi-TRP mode. The operations of 1415 may be performed according to the methods described herein. In some examples, aspects of the operations of 1415 may be performed by a switching manager as described with reference to FIGS. 5 through 8.

At 1420, the UE may initiate, based on identifying the indication, a timer associated with the first control channel monitoring state. The operations of 1420 may be performed according to the methods described herein. In some examples, aspects of the operations of 1420 may be performed by a timer-based switching manager as described with reference to FIGS. 5 through 8.

At 1425, the UE may switch, based on the indication, to the second control channel monitoring state where the UE is configured to monitor the first control channel of the first TRP and monitor a second control channel of a second TRP. The operations of 1425 may be performed according to the methods described herein. In some examples, aspects of the operations of 1425 may be performed by a second control channel monitoring manager as described with reference to FIGS. 5 through 8.

At 1430, the UE may switch, upon expiry of a timer duration associated with the timer, from the first control channel monitoring state to the second control channel monitoring state. The operations of 1430 may be performed according to the methods described herein. In some examples, aspects of the operations of 1430 may be performed by a timer-based switching manager as described with reference to FIGS. 5 through 8.

Figure 15:
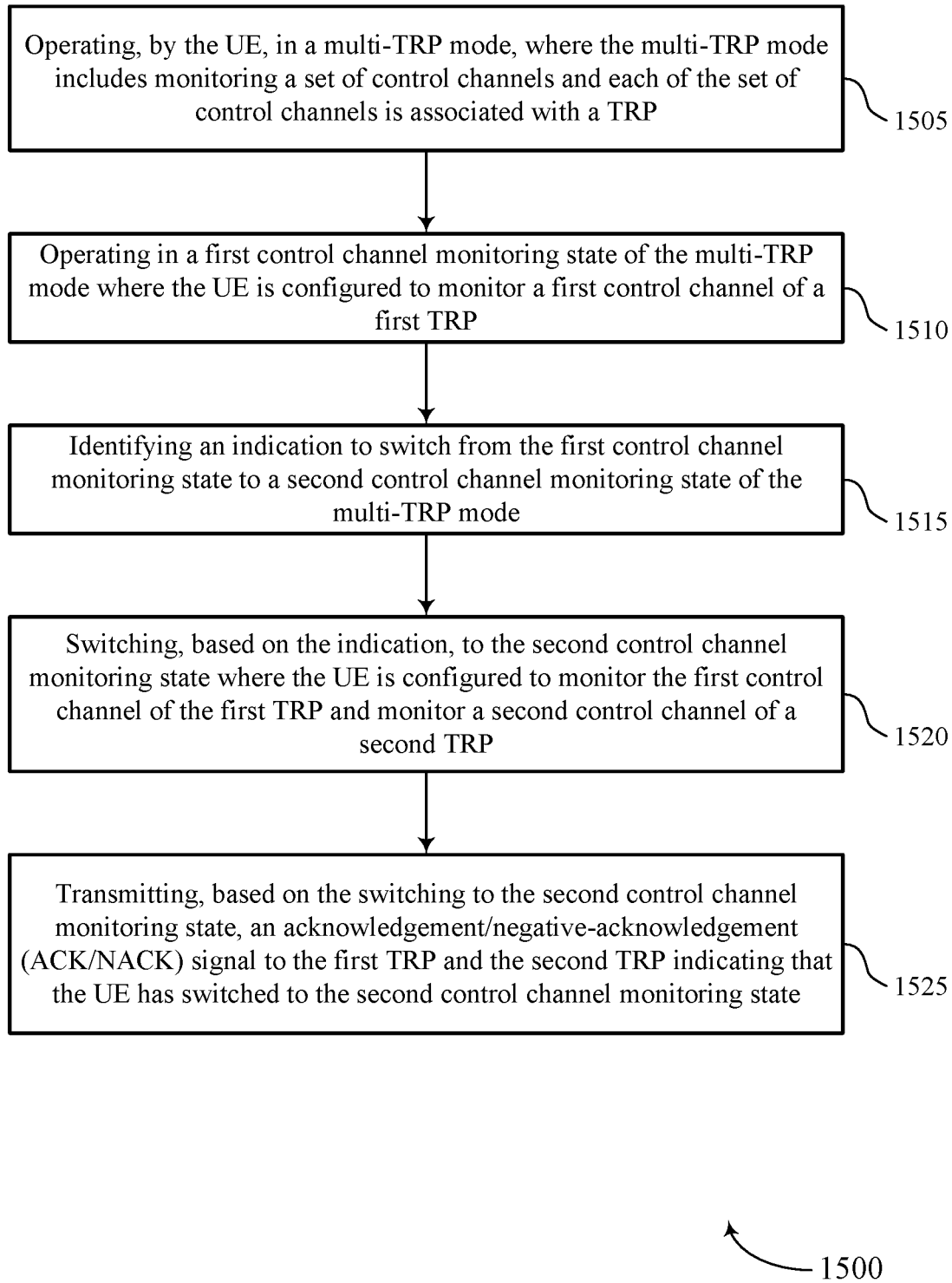
FIG. 15 shows a flowchart illustrating a method that supports techniques for switching control channel monitoring for multi-TRP in accordance with various aspects of the present disclosure.

FIG. 15 shows a flowchart illustrating a method 1500 that supports techniques for switching control channel monitoring for multi-TRP in accordance with various aspects of the present disclosure. The operations of method 1500 may be implemented by a UE (e.g., a UE 115, a UE 215, a UE 315, or a UE 410) or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may operate, by the UE, in a multi-TRP mode, where the multi-TRP mode includes monitoring a set of control channels and each of the set of control channels is associated with a TRP. The operations of 1505 may be performed according to the methods described herein. In some examples, aspects of the operations of 1505 may be performed by a single/multi-TRP mode manager as described with reference to FIGS. 5 through 8.

At 1510, the UE may operate in a first control channel monitoring state of the multi-TRP mode where the UE is configured to monitor a first control channel of a first TRP. The operations of 1510 may be performed according to the methods described herein. In some examples, aspects of the operations of 1510 may be performed by a first control channel monitoring manager as described with reference to FIGS. 5 through 8.

At 1515, the UE may identify an indication to switch from the first control channel monitoring state to a second control channel monitoring state of the multi-TRP mode. The operations of 1515 may be performed according to the methods described herein. In some examples, aspects of the operations of 1515 may be performed by a switching manager as described with reference to FIGS. 5 through 8.

At 1520, the UE may switch, based on the indication, to the second control channel monitoring state where the UE is configured to monitor the first control channel of the first TRP and monitor a second control channel of a second TRP. The operations of 1520 may be performed according to the methods described herein. In some examples, aspects of the operations of 1520 may be performed by a second control channel monitoring manager as described with reference to FIGS. 5 through 8.

At 1525, the UE may transmit, based on the switching to the second control channel monitoring state, an ACK/NACK signal to the first TRP and the second TRP indicating that the UE has switched to the second control channel monitoring state. The operations of 1525 may be performed according to the methods described herein. In some examples, aspects of the operations of 1525 may be performed by a switching indication manager as described with reference to FIGS. 5 through 8.

Figure 16:
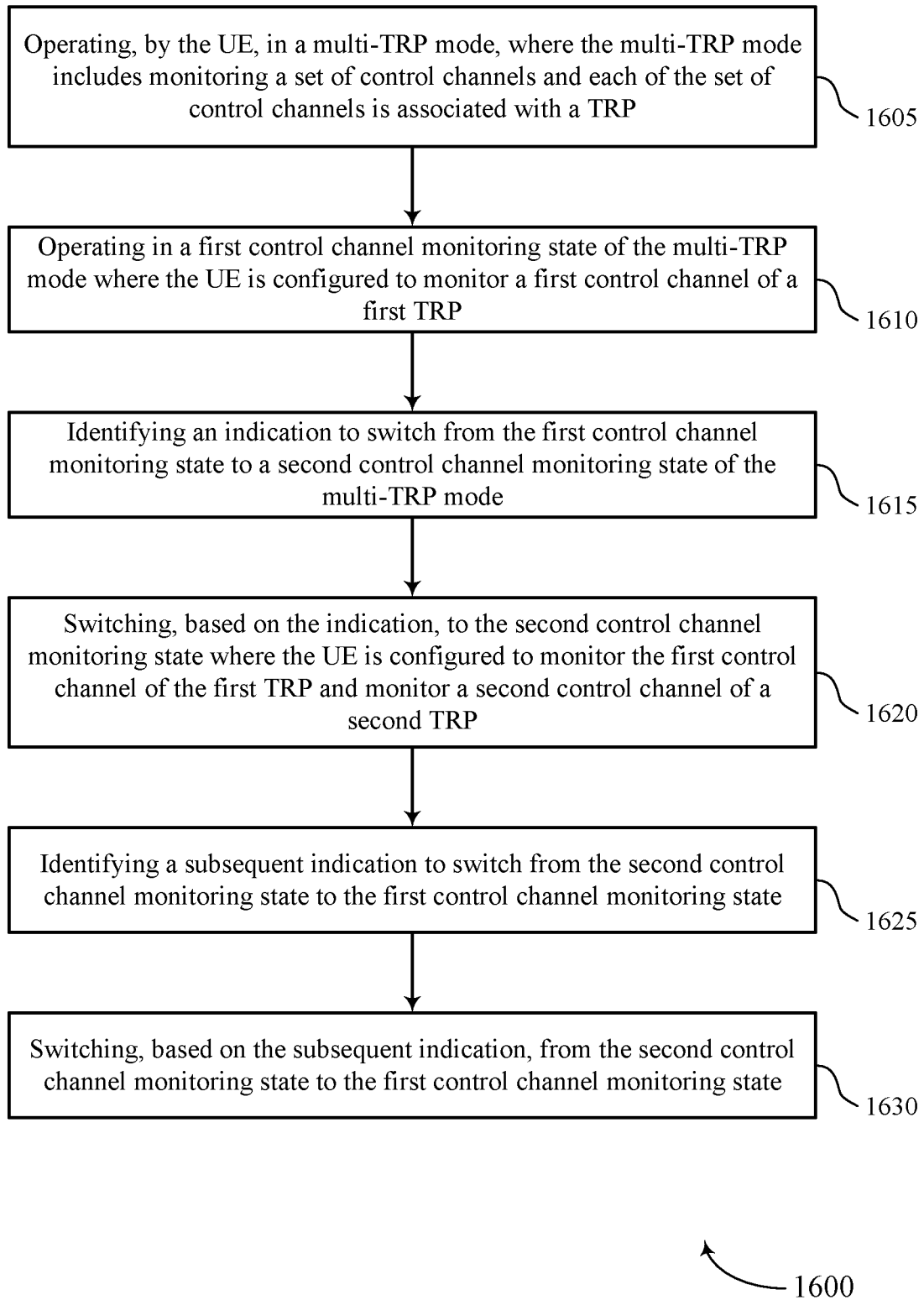
FIG. 16 shows a flowchart illustrating a method that supports techniques for switching control channel monitoring for multi-TRP in accordance with various aspects of the present disclosure.

FIG. 16 shows a flowchart illustrating a method 1600 that supports techniques for switching control channel monitoring for multi-TRP in accordance with various aspects of the present disclosure. The operations of method 1600 may be implemented by a UE (e.g., a UE 115, a UE 215, a UE 315, or a UE 410) or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may operate, by the UE, in a multi-TRP mode, where the multi-TRP mode includes monitoring a set of control channels and each of the set of control channels is associated with a TRP. The operations of 1605 may be performed according to the methods described herein. In some examples, aspects of the operations of 1605 may be performed by a single/multi-TRP mode manager as described with reference to FIGS. 5 through 8.

At 1610, the UE may operate in a first control channel monitoring state of the multi-TRP mode where the UE is configured to monitor a first control channel of a first TRP. The operations of 1610 may be performed according to the methods described herein. In some examples, aspects of the operations of 1610 may be performed by a first control channel monitoring manager as described with reference to FIGS. 5 through 8.

At 1615, the UE may identify an indication to switch from the first control channel monitoring state to a second control channel monitoring state of the multi-TRP mode. The operations of 1615 may be performed according to the methods described herein. In some examples, aspects of the operations of 1615 may be performed by a switching manager as described with reference to FIGS. 5 through 8.

At 1620, the UE may switch, based on the indication, to the second control channel monitoring state where the UE is configured to monitor the first control channel of the first TRP and monitor a second control channel of a second TRP. The operations of 1620 may be performed according to the methods described herein. In some examples, aspects of the operations of 1620 may be performed by a second control channel monitoring manager as described with reference to FIGS. 5 through 8.

At 1625, the UE may identify a subsequent indication to switch from the second control channel monitoring state to the first control channel monitoring state. The operations of 1625 may be performed according to the methods described herein. In some examples, aspects of the operations of 1625 may be performed by a subsequent switching manager as described with reference to FIGS. 5 through 8.

At 1630, the UE may switch, based on the subsequent indication, from the second control channel monitoring state to the first control channel monitoring state. The operations of 1630 may be performed according to the methods described herein. In some examples, aspects of the operations of 1630 may be performed by a subsequent switching manager as described with reference to FIGS. 5 through 8.

Figure 17:
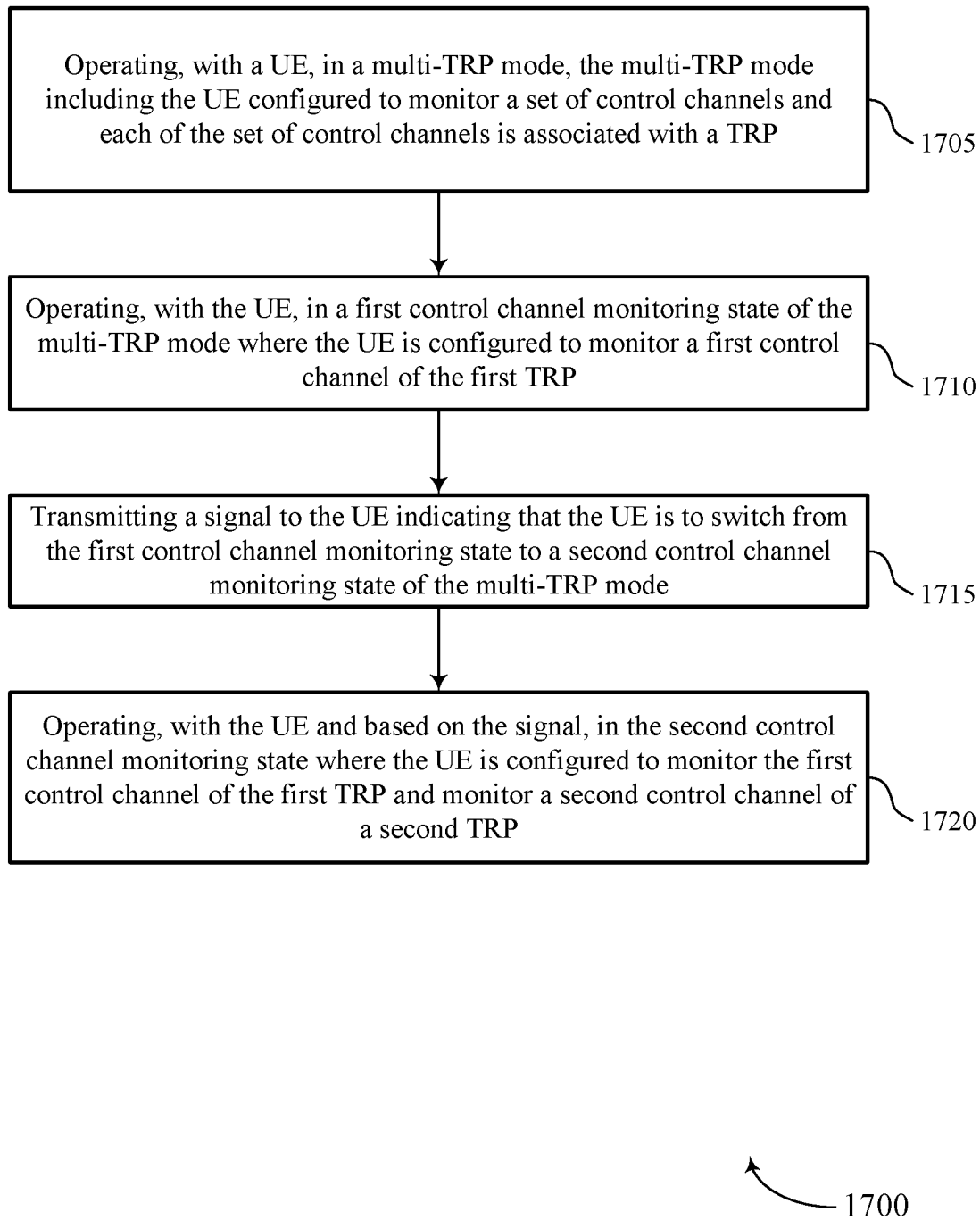
FIG. 17 shows a flowchart illustrating a method that supports techniques for switching control channel monitoring for multi-TRP in accordance with various aspects of the present disclosure.

FIG. 17 shows a flowchart illustrating a method 1700 that supports techniques for switching control channel monitoring for multi-TRP in accordance with various aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may operate, with a UE, in a multi-TRP mode, the multi-TRP mode including the UE configured to monitor a set of control channels and each of the set of control channels is associated with a TRP. The operations of 1705 may be performed according to the methods described herein. In some examples, aspects of the operations of 1705 may be performed by a single/multi-TRP mode manager as described with reference to FIGS. 9 through 12.

At 1710, the base station may operate, with the UE, in a first control channel monitoring state of the multi-TRP mode where the UE is configured to monitor a first control channel of the first TRP. The operations of 1710 may be performed according to the methods described herein. In some examples, aspects of the operations of 1710 may be performed by a first control channel monitoring manager as described with reference to FIGS. 9 through 12.

At 1715, the base station may transmit a signal to the UE indicating that the UE is to switch from the first control channel monitoring state to a second control channel monitoring state of the multi-TRP mode. The operations of 1715 may be performed according to the methods described herein. In some examples, aspects of the operations of 1715 may be performed by a switching manager as described with reference to FIGS. 9 through 12.

At 1720, the base station may operate, with the UE and based on the signal, in the second control channel monitoring state where the UE is configured to monitor the first control channel of the first TRP and monitor a second control channel of a second TRP. The operations of 1720 may be performed according to the methods described herein. In some examples, aspects of the operations of 1720 may be performed by a second control channel monitoring manager as described with reference to FIGS. 9 through 12.

Figure 18:
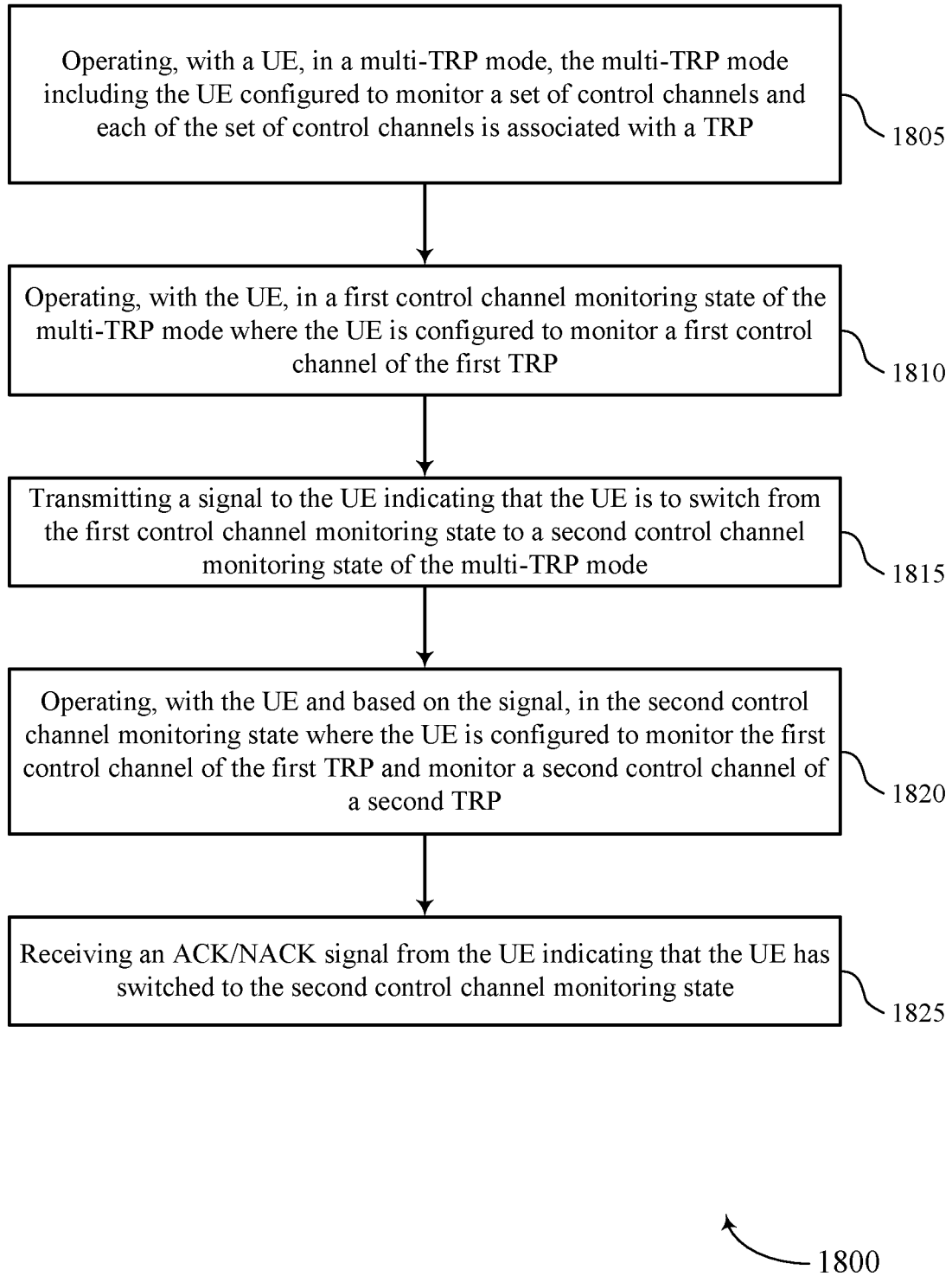
FIG. 18 shows a flowchart illustrating a method that supports techniques for switching control channel monitoring for multi-TRP in accordance with various aspects of the present disclosure.

FIG. 18 shows a flowchart illustrating a method 1800 that supports techniques for switching control channel monitoring for multi-TRP in accordance with various aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may operate, with a UE, in a multi-TRP mode, the multi-TRP mode including the UE configured to monitor a set of control channels and each of the set of control channels is associated with a TRP. The operations of 1805 may be performed according to the methods described herein. In some examples, aspects of the operations of 1805 may be performed by a single/multi-TRP mode manager as described with reference to FIGS. 9 through 12.

At 1810, the base station may operate, with the UE, in a first control channel monitoring state of the multi-TRP mode where the UE is configured to monitor a first control channel of the first TRP. The operations of 1810 may be performed according to the methods described herein. In some examples, aspects of the operations of 1810 may be performed by a first control channel monitoring manager as described with reference to FIGS. 9 through 12.

At 1815, the base station may transmit a signal to the UE indicating that the UE is to switch from the first control channel monitoring state to a second control channel monitoring state of the multi-TRP mode. The operations of 1815 may be performed according to the methods described herein. In some examples, aspects of the operations of 1815 may be performed by a switching manager as described with reference to FIGS. 9 through 12.

At 1820, the base station may operate, with the UE and based on the signal, in the second control channel monitoring state where the UE is configured to monitor the first control channel of the first TRP and monitor a second control channel of a second TRP. The operations of 1820 may be performed according to the methods described herein. In some examples, aspects of the operations of 1820 may be performed by a second control channel monitoring manager as described with reference to FIGS. 9 through 12.

At 1825, the base station may receive an ACK/NACK signal from the UE indicating that the UE has switched to the second control channel monitoring state. The operations of 1825 may be performed according to the methods described herein. In some examples, aspects of the operations of 1825 may be performed by a switching indication manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell, for example, covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    monitoring a first control channel of a first transmission/reception point;
    receiving, from the first transmission/reception point, a bandwidth part switching downlink control information indicating to switch from monitoring the first control channel of the first transmission/reception point to monitoring the first control channel of the first transmission/reception point and a second control channel of a second transmission/reception point; and
    monitoring, based at least in part on receiving the bandwidth part switching downlink control information, the first control channel of the first transmission/reception point and the second control channel of the second transmission/reception point.

2. The method of claim 1, further comprising:
    transmitting, based at least in part on switching from monitoring the first control channel of the first transmission/reception point to monitoring the first control channel of the first transmission/reception point and the second control channel of the second transmission/reception point, an acknowledgement/negative-acknowledgement (ACK/NACK) signal to the first transmission/reception point and the second transmission/reception point indicating that the UE has switched to monitoring the first control channel of the first transmission/reception point and the second control channel of the second transmission/reception point.

3. The method of claim 1, further comprising:
    identifying a subsequent indication to switch from monitoring the first control channel of the first transmission/reception point and the second control channel of the second transmission/reception point to monitoring the first control channel of the first transmission/reception point; and
    switching, based at least in part on the subsequent indication, from monitoring the first control channel of the first transmission/reception point and the second control channel of the second transmission/reception point to monitoring the first control channel of the first transmission/reception point.

4. The method of claim 3, wherein identifying the subsequent indication comprises:
    receiving, from the first transmission/reception point or the second transmission/reception point, at least one of a downlink control information (DCI) signal, a medium access control (MAC) control element (CE) signal, or a combination thereof, indicating for the UE to switch to monitoring the first control channel of the first transmission/reception point.

5. The method of claim 3, wherein identifying the subsequent indication comprises:
    initiating, upon switching to monitoring the first control channel of the first transmission/reception point and the second control channel of the second transmission/reception point, a timer associated with monitoring the first control channel of the first transmission/reception point and the second control channel of the second transmission/reception point; and
    switching, upon expiry of the timer, to monitoring the first control channel of the first transmission/reception point.

6. The method of claim 5, further comprising:
    receiving, from the first transmission/reception point, the second transmission/reception point, or a combination thereof, at least one of a downlink control information (DCI), a medium access control (MAC) control element (CE), a radio resource control (RRC) signal, or a combination thereof, indicating a duration of the timer.

7. A method for wireless communication at a first transmission/reception point, comprising:
    communicating with a user equipment (UE) via a first control channel while the UE is configured to monitor the first control channel of the first transmission/reception point;
    transmitting a bandwidth part switching downlink control information to the UE indicating that the UE is to switch from monitoring the first control channel of the first transmission/reception point to monitoring the first control channel of the first transmission/reception point and a second control channel of a second transmission/reception point; and
    communicating, based at least in part on transmitting the bandwidth part switching downlink control information, with the UE via the first control channel while the UE is configured to monitor the first control channel of the first transmission/reception point and the second control channel of the second transmission/reception point.

8. The method of claim 7, further comprising:
    receiving, from the UE and while the UE is configured to monitor the first control channel of the first transmission/reception point, a channel performance measurement report indicating a result of a channel performance measurement using one or more signals from the first transmission/reception point.

9. The method of claim 7, further comprising:
    transmitting an indication of a timer duration for a timer associated with monitoring the first control channel of the first transmission/reception point, monitoring the first control channel of the first transmission/reception point and the second control channel of the second transmission/reception point, or a combination thereof.

10. The method of claim 7, further comprising:
    receiving an acknowledgement/negative-acknowledgement (ACK/NACK) signal from the UE indicating that the UE has switched to monitoring the first control channel of the first transmission/reception point and the second control channel of the second transmission/reception point.

11. The method of claim 7, further comprising:
transmitting, to the UE, a subsequent indication comprising at least one of a downlink control information (DCI) signal, a medium access control (MAC) control element (CE) signal, or a combination thereof, indicating for the UE to switch from monitoring the first control channel of the first transmission/reception point and the second control channel of the second transmission/reception point to monitoring the first control channel of the first transmission/reception point.

12. An apparatus for wireless communication at a user equipment (UE), comprising:
a processor;
memory coupled with the processor; and
instructions stored in the memory and executable by the processor to cause the apparatus to:
monitor a first control channel of a first transmission/reception point;
receive, from the first transmission/reception point, a bandwidth part switching downlink control information indicating to switch from monitoring the first control channel of the first transmission/reception point to monitoring the first control channel of the first transmission/reception point and a second control channel of a second transmission/reception point; and
monitor, based at least in part on receiving the bandwidth part switching downlink control information, the first control channel of the first transmission/reception point and the second control channel of the second transmission/reception point.

13. The apparatus of claim 12, wherein the instructions are further executable by the processor to cause the apparatus to:
transmit, based at least in part on switching from monitoring the first control channel of the first transmission/reception point to monitoring the first control channel of the first transmission/reception point and the second control channel of the second transmission/reception point, an acknowledgement/negative-acknowledgement (ACK/NACK) signal to the first transmission/reception point and the second transmission/reception point indicating that the UE has switched to monitoring the first control channel of the first transmission/reception point and the second control channel of the second transmission/reception point.

14. The apparatus of claim 12, wherein the instructions are further executable by the processor to cause the apparatus to:
identify a subsequent indication to switch from monitoring the first control channel of the first transmission/reception point and the second control channel of the second transmission/reception point to monitoring the first control channel of the first transmission/reception point; and
switch, based at least in part on the subsequent indication, from monitoring the first control channel of the first transmission/reception point and the second control channel of the second transmission/reception point to monitoring the first control channel of the first transmission/reception point.

15. The apparatus of claim 14, wherein the instructions to identify the subsequent indication are executable by the processor to cause the apparatus to:

receive, from the first transmission/reception point or the second transmission/reception point, at least one of a downlink control information (DCI) signal, a medium access control (MAC) control element (CE) signal, or a combination thereof, indicating for the UE to switch to monitoring the first control channel of the first transmission/reception point.

16. The apparatus of claim 14, wherein the instructions to identify the subsequent indication are executable by the processor to cause the apparatus to:
initiate, upon switching to monitoring the first control channel of the first transmission/reception point and the second control channel of the second transmission/reception point, a timer associated with monitoring the first control channel of the first transmission/reception point and the second control channel of the second transmission/reception point; and
switch, upon expiry of the timer, to monitoring the first control channel of the first transmission/reception point.

17. The apparatus of claim 16, wherein the instructions are further executable by the processor to cause the apparatus to:
receive, from the first transmission/reception point, the second transmission/reception point, or a combination thereof, at least one of a downlink control information (DCI), a medium access control (MAC) control element (CE), a radio resource control (RRC) signal, or a combination thereof, indicating a duration of the timer.

18. An apparatus for wireless communication at a first transmission/reception point, comprising:
a processor;
memory coupled with the processor; and
instructions stored in the memory and executable by the processor to cause the apparatus to:
communicate with a user equipment (UE) via a first control channel while the UE is configured to monitor the first control channel of the first transmission/reception point;
transmit a bandwidth part switching downlink control information to the UE indicating that the UE is to switch from monitoring the first control channel of the first transmission/reception point to monitoring the first control channel of the first transmission/reception point and a second control channel of a second transmission/reception point; and
communicate, based at least in part on transmitting the bandwidth part switching downlink control information, with the UE via the first control channel while the UE is configured to monitor the first control channel of the first transmission/reception point and the second control channel of the second transmission/reception point.

19. The apparatus of claim 18, wherein the instructions are further executable by the processor to cause the apparatus to:
receive, from the UE and while the UE is configured to monitor the first control channel of the first transmission/reception point, a channel performance measurement report indicating a result of a channel performance measurement using one or more signals from the first transmission/reception point.

20. The apparatus of claim 18, wherein the instructions are further executable by the processor to cause the apparatus to:
transmit an indication of a timer duration for a timer associated with monitoring the first control channel of the first transmission/reception point, monitoring the first control channel of the first transmission/reception point and the second control channel of the second transmission/reception point, or a combination thereof.

21. The apparatus of claim 18, wherein the instructions are further executable by the processor to cause the apparatus to:
receive an acknowledgement/negative-acknowledgement (ACK/NACK) signal from the UE indicating that the UE has switched to monitoring the first control channel of the first transmission/reception point and the second control channel of the second transmission/reception point.

22. The apparatus of claim 18, wherein the instructions are further executable by the processor to cause the apparatus to:
transmit, to the UE, a subsequent indication comprising at least one of a downlink control information (DCI) signal, a medium access control (MAC) control element (CE) signal, or a combination thereof, indicating for the UE to switch from monitoring the first control channel of the first transmission/reception point and the second control channel of the second transmission/reception point to monitoring the first control channel of the first transmission/reception point.

* * * * *